United States Patent
Matsuda et al.

(10) Patent No.: US 7,505,461 B2
(45) Date of Patent: Mar. 17, 2009

(54) DATA TRANSFER CONTROL DEVICE, ELECTRONIC INSTRUMENT, AND DATA TRANSFER CONTROL METHOD

(75) Inventors: Kuniaki Matsuda, Sapporo (JP);
Kenyou Nagao, Sapporo (JP);
Nobuyuki Saito, Sapporo (JP); Shun Oshita, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 923 days.

(21) Appl. No.: 10/834,192

(22) Filed: Apr. 29, 2004

(65) Prior Publication Data
US 2005/0002391 A1 Jan. 6, 2005

(30) Foreign Application Priority Data
May 6, 2003 (JP) ............................. 2003-127806

(51) Int. Cl.
*H04L 12/56* (2006.01)
(52) U.S. Cl. ........................... 370/389; 370/449
(58) Field of Classification Search .................. None
See application file for complete search history.

(56) References Cited
U.S. PATENT DOCUMENTS
2003/0030412 A1 2/2003 Matsuda et al.
2004/0250087 A1* 12/2004 Ray et al. .................... 713/189
2005/0050104 A1* 3/2005 Kadyk et al. ............. 707/104.1
2005/0144199 A2* 6/2005 Hayden ....................... 707/204

FOREIGN PATENT DOCUMENTS
JP A 10-303948 11/1998

OTHER PUBLICATIONS
Qi-Mei Chin et al., "USB Hub Specification", Electronic Automatic Device, vol. 21, No. 7, Jul. 2001, p. 76.
* cited by examiner

*Primary Examiner*—Firmin Backer
*Assistant Examiner*—Rhonda Murphy
(74) *Attorney, Agent, or Firm*—Oliff & Berridge, PLC

(57) ABSTRACT

A data transfer control device having: a hub dedicated data storage section which stores a packet transferred between the data transfer control device and a hub; a packet transmission section which cyclically issues a token packet to the hub for asking whether the state of the hub has changed or not; a packet reception section which receives a response packet sent from the hub in response to the token packet; and a transfer controller which writes the response packet received by the packet reception section into the hub dedicated data storage section, and generates an interrupt which indicates that the state of the hub has changed.

26 Claims, 17 Drawing Sheets

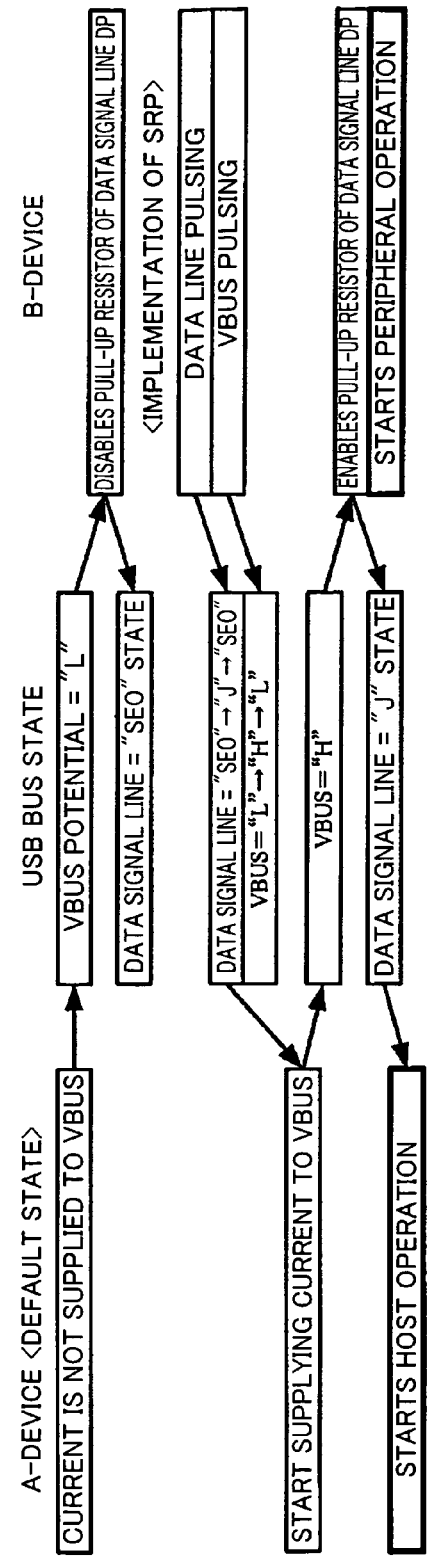
FIG. 3A SRP (Session Request Protocol)
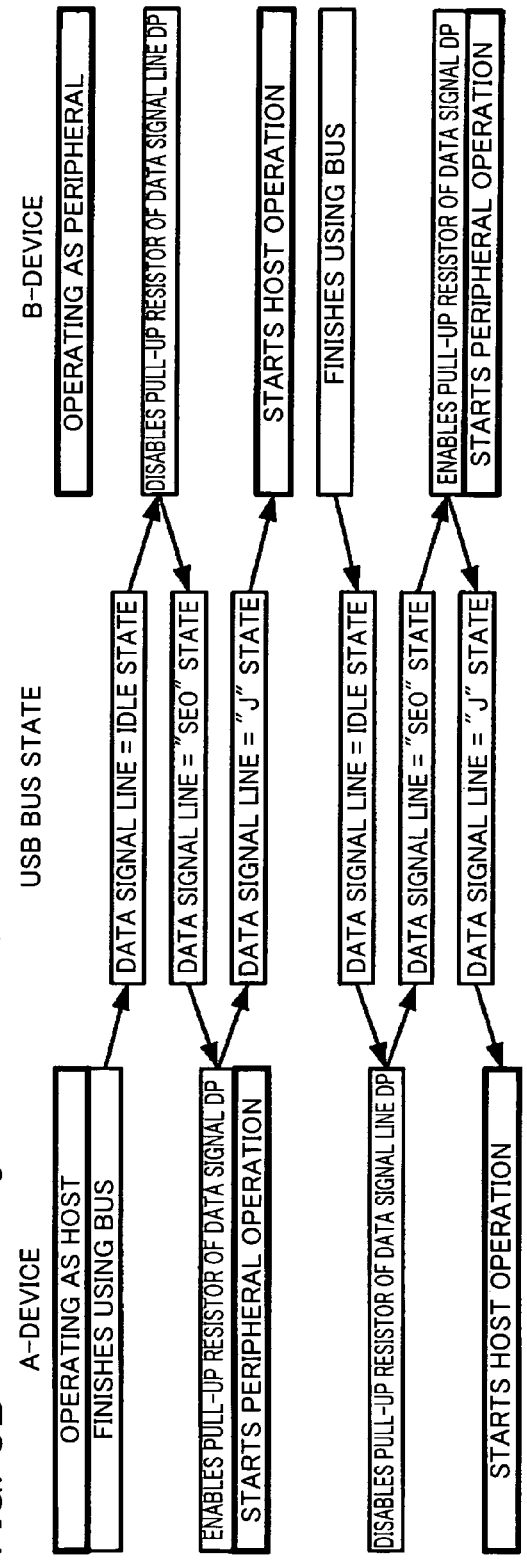
FIG. 3B HNP (Host Negotiation Protocol)

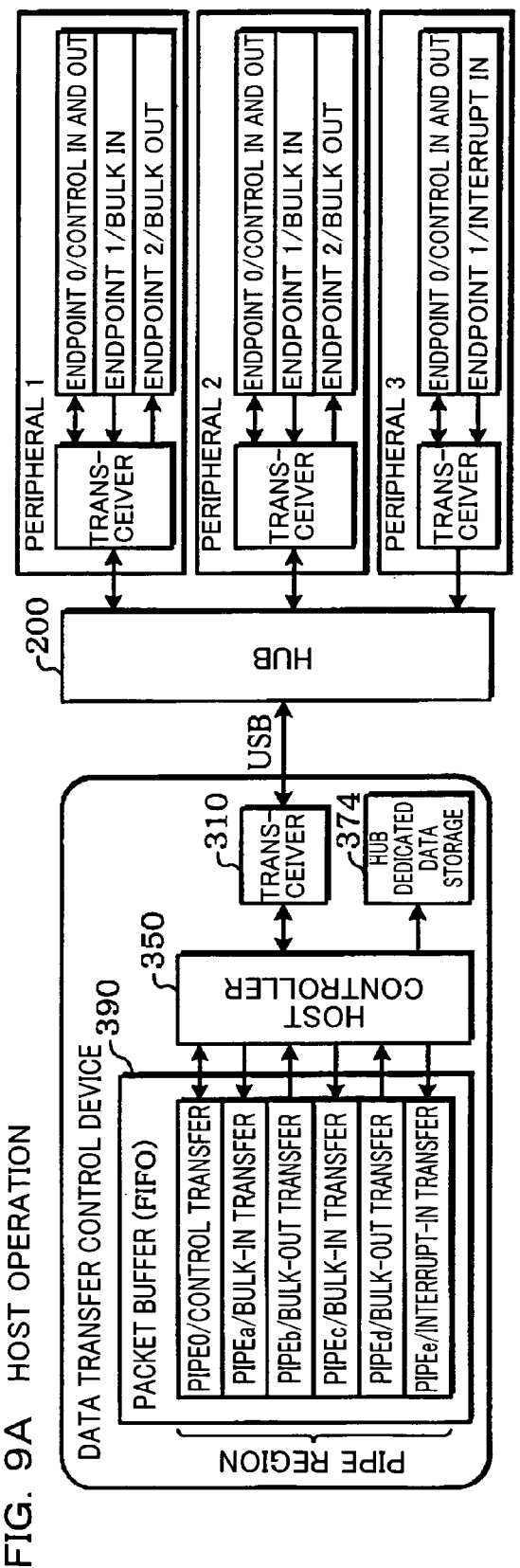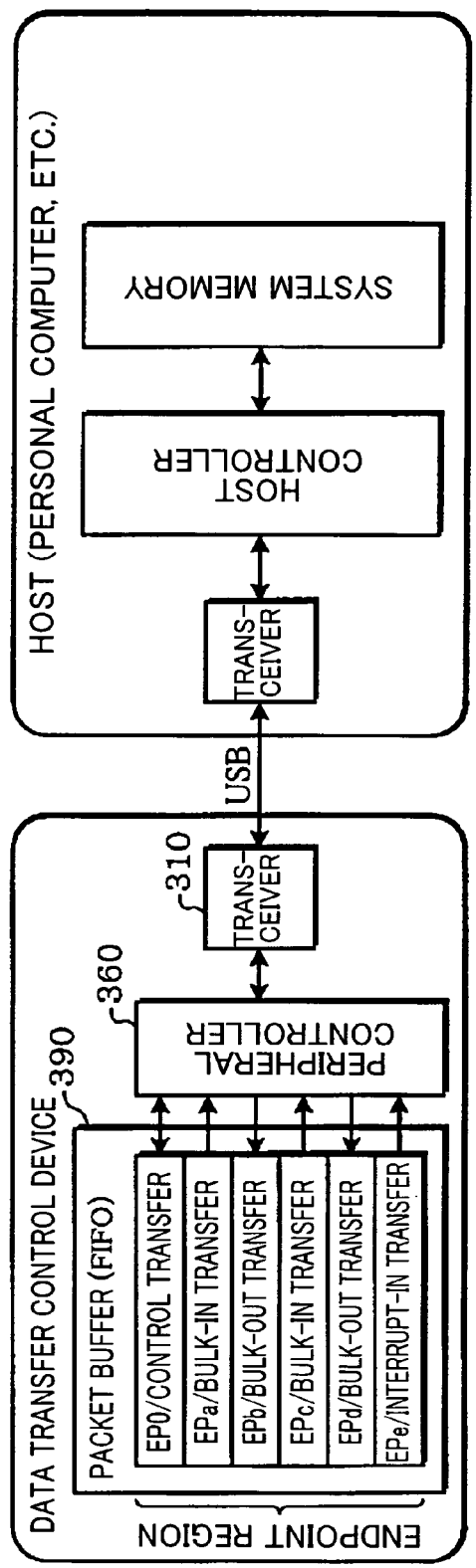

DATA TRANSFER CONTROL DEVICE, ELECTRONIC INSTRUMENT, AND DATA TRANSFER CONTROL METHOD

Japanese Patent Application No. 2003-127806, filed on May 6, 2003, is hereby incorporated by reference in its entirety.

BACKGROUND OF THE INVENTION

The present invention relates to a data transfer control device, an electronic instrument, and a data transfer control method.

The universal serial bus (USB) standard has been known as an interface standard for connecting a personal computer with a peripheral (electronic instrument in a broad sense). The USB (high-speed serial bus) has advantages in that instruments such as a mouse, keyboard, and printer can be connected using connectors of the same standard and so-called plug & play and hot plug can be implemented. The USB 2.0 standard has been developed and attracted attention as a standard which can implement a data transfer rate of 480 Mbps (megabits per second) (HS mode), which is remarkably higher than that of the USB 1.1 standard, while maintaining compatibility with the USB 1.1 standard.

BRIEF SUMMARY OF THE INVENTION

According to a first aspect of the present invention, there is provided a data transfer control device for data transfer, the data transfer control device comprising:

a hub dedicated data storage section which stores a packet transferred between the data transfer control device and a hub;

a packet transmission section which cyclically issues a token packet to the hub for asking whether the state of the hub has changed or not;

a packet reception section which receives a response packet sent from the hub in response to the token packet; and a transfer controller which writes the response packet received by the packet reception section into the hub dedicated data storage section, and generates an interrupt which indicates that the state of the hub has changed.

According to a second aspect of the present invention, there is provided an electronic instrument comprising: the above-described data transfer control device; and a processor which controls the data transfer control device.

According to a third aspect of the present invention, there is provided a data transfer control method for data transfer, the method comprising:

cyclically issuing a token packet for asking whether the state of a hub has changed or not;

receiving a response packet from the hub in response to the token packet; and writing the response packet into a hub dedicated data storage section and generating an interrupt which indicates that the state of the hub has changed, on condition that the response packet is not a first packet which indicates that there is no data to send.

BRIEF DESCRIPTION OF THE SEVERAL VIEWS OF THE DRAWING

FIGS. 3A and 3B show SRP and HNP procedures.

FIGS. 9A and 9B are diagrams for illustrating pipe regions and endpoint regions.

DETAILED DESCRIPTION OF THE EMBODIMENT

Embodiments of the present invention are described below. Note that the embodiments described hereunder do not in any way limit the scope of the invention defined by the claims laid out herein. Note also that all of the elements described below should not be taken as essential requirements for the present invention.

In the USB standard, bus topology centering on a host represented by a personal computer is employed. The host acquires information on a device connected with the bus (device descriptor), and assigns a unique address to the device. The host schedules data transfers between devices, and transfers data between the host and an endpoint of each device.

In the USB standard, the host can be connected with a plurality of devices by providing a hub. In the USB standard, in order to implement plug & play and hot plug, the host acquires the state of the hub when a device is newly connected with the hub or a device is removed after the power is turned ON or the like, and reschedules data transfers or the like. Therefore, the host establishes a pipe which is a logical channel for the hub in the same manner as other devices, and periodically monitors a change in the state of the hub.

However, resources on the host are allocated to the pipe established for monitoring the hub in the same manner as pipes established for other devices. Therefore, limited resources on the host are used for monitoring the hub even though the state of the hub is changed with low frequency, whereby resources cannot be effectively utilized.

According to the following embodiments, a data transfer control device capable of efficiently utilizing resources even if a hub is connected, an electronic instrument including the same, and a data transfer control method can be provided.

The embodiments of the present invention are described below in detail with reference to the drawings.

1. USB Data Transfer

Data transfer through the USB (or a serial bus in a broad sense) is briefly described below. In the USB standard, a host has the initiative in data transfer. Specifically, the host starts a transaction of data transfer, and controls the majority of data transfer. Therefore, it suffices that a device (target) merely respond to the request from the host. This enables the processing and configuration of the device to be simplified, whereby an inexpensive central processing unit (CPU) (or a processor in a broad sense) can be used as a CPU included in the device.

Figure 1:
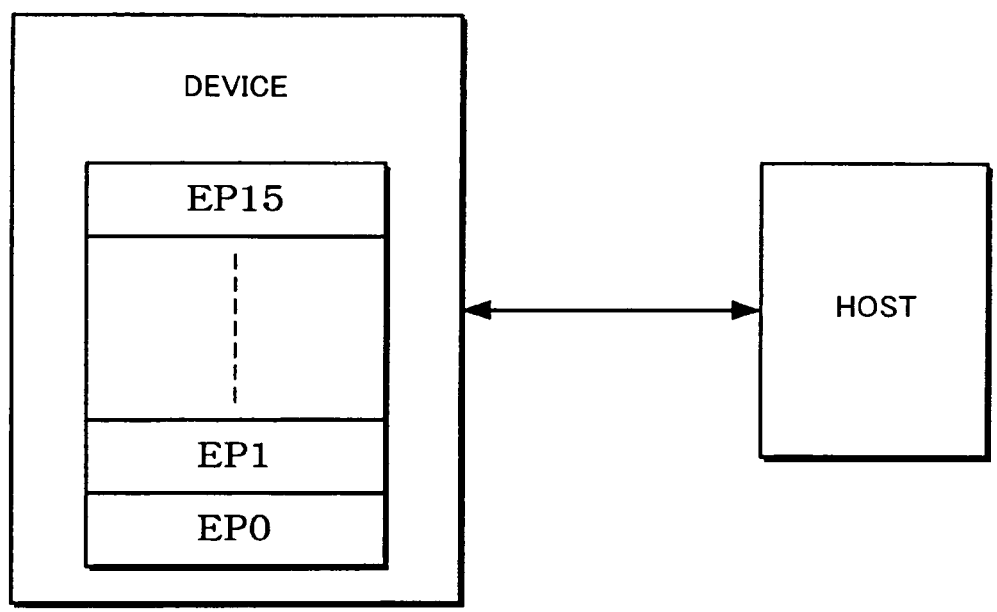
FIG. 1 is a diagram for illustrating the connection relationship between a host and a device.

In the USB standard, endpoints (EP0 to EP15) shown in FIG. 1 are provided to the device in order to implement data transfer in which the host takes the initiative. In the USB standard, a plurality of logical channels (pipes) can be provided between the host and one device. The end of each pipe on the side of the device is called an endpoint. Each endpoint is physically implemented by using a first-in first-out (FIFO) memory which can store data for at least one packet.

An endpoint can be uniquely addressed by using a device address and an endpoint number. Specifically, the host can freely transmit and receive data between the host and a desired endpoint by specifying the device address and the endpoint number. The configuration of endpoints is arbitrary on the device side. The host can know assignment of endpoint numbers, data size of the storage region to be allocated to each endpoint, and the like during enumeration processing.

2. USB On-The-Go (OTG) Standard

In the USB standard, an interface standard called the OTG standard which allows a device connected with a host to have a host function has been developed. According to the OTG standard, data transfer conforming to the USB standard can be performed by connecting devices. For example, an image taken by using a digital camera can be printed by directly connecting the digital camera with a printer. Or, data can be saved by connecting a digital camera or a digital video camera with a storage device.

2.1 A-Device and B-Device

Figure 2A:
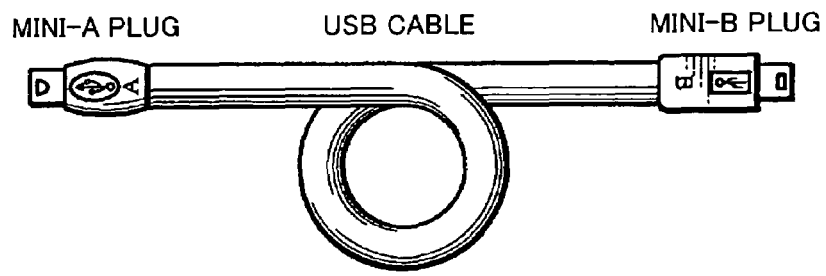
FIGS. 2A, 2B, and 2C are diagrams for illustrating the USB OTG standard.

The OTG standard defines a Mini-A plug and a Mini-B plug shown in FIG. 2A as the connector standard. The OTG standard defines a Mini-AB receptacle as a connector to which both the Mini-A plug and the Mini-B plug can be connected.

Figure 2B:
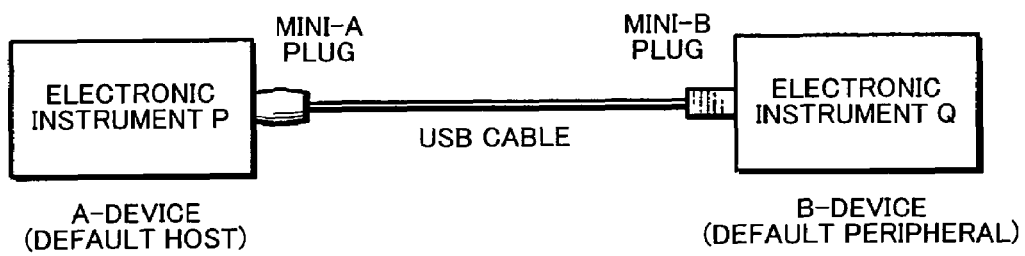
Figure 2C:
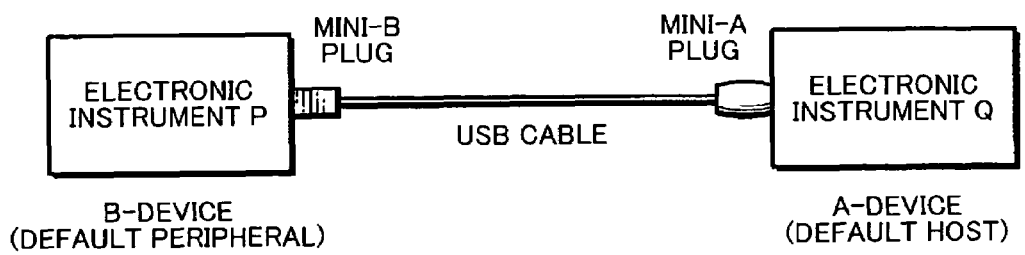

As shown in FIG. 2B, when an electronic instrument P is connected with the Mini-A plug of the USB cable and an electronic instrument Q is connected with the Mini-B plug, the electronic instrument P becomes an A-device and the electronic instrument Q becomes a B-device. As shown in FIG. 2C, when the Mini-B plug and the Mini-A plug are respectively connected to the electronic instruments P and Q, the electronic instruments P and Q respectively become the B-device and the A-device.

An ID pin is connected with GND in the Mini-A plug, and an ID pin is in a floating state in the Mini-B plug. The electronic instrument judges whether the Mini-A plug or the Mini-B plug is connected therewith by detecting the voltage level of the ID pin by using a built-in pull-up resistor.

In the OTG standard, the A-device (or a master) provides a power supply (VBUS) (or a supplier), and the B-device (or a slave) receives the power supply (receiver). The A-device becomes a host in default, and the B-device becomes a peripheral in default. A peripheral operates as a device in the USB 2.0 standard.

2.2 Dual-Role Device

The OTG standard defines a dual-role device which can have the role of the host (or a simple host) and the role of the peripheral.

The dual-role device can perform the host operation as the host and perform the peripheral operation as the peripheral. In the case where a partner connected with the dual-role device is the host or peripheral in the conventional USB standard, the role of the dual-role device is determined uniquely. In other words, if the connection partner is the host, the dual-role device becomes the peripheral. If the connection partner is the peripheral, the dual-role device becomes the host.

If the connection partner is a dual-role device, the dual-role devices can exchange the role of the host and the role of the peripheral.

2.3 SRP and HNP

The dual-role device has functions of Session Request Protocol (SRP) and Host Negotiation Protocol (HNP) as shown in FIGS. 3A and 3B.

SRP is a protocol for the B-device to request the A-device to supply power to VBUS.

In the OTG standard, the A-device which does not use the bus can stop supplying power to VBUS. This prevents occurrence of unnecessary power consumption in the case where the A-device is a small portable instrument, for example. If the B-device wants the A-device to supply power to VBUS after the A-device has stopped supplying power to VBUS, the B-device requests the A-device to supply power to VBUS by using SRP.

FIG. 3A shows an outline of SRP. As shown in FIG. 3A, the B-device requests the A-device to supply power to VBUS by data-line pulsing or VBUS pulsing. The B-device starts the peripheral operation and the A-device starts the host operation after the A-device has started supplying power to VBUS.

As described with reference to FIGS. 2A to 2C, in the case where the dual-role devices are connected, the A-device connected with the Mini-A plug becomes the default host, and the B-device connected with the Mini-B plug becomes the default peripheral. In the OTG standard, the role of the host and the role of the peripheral can be exchanged without plugging or unplugging. HNP is a protocol for exchanging the role of the host and the role of the peripheral.

FIG. 3B shows an outline of HNP. When the A-device which operates as the default host finishes using the bus, the bus is in an idle state. The B-device then disables a pull-up resistor of a data signal line DP (D+), and the A-device enables a pull-up resistor of the data signal line DP. This allows the role of the A-device to be changed to the peripheral from the host, whereby the A-device starts the operation as the peripheral. The role of the B-device is changed to the host from the peripheral, whereby the B-device starts the operation as the host.

When the B-device finishes using the bus and the A-device disables the pull-up resistor of the data signal line DP, the B-device enables the pull-up resistor of the data signal line DP. This allows the role of the B-device to be returned to the peripheral from the host, whereby the B-device starts the operation as the peripheral. The role of the A-device is returned to the host from the peripheral, whereby the A-device starts the operation as the host.

According to the above-described OTG standard, a portable instrument such as a portable telephone or a digital camera can operate as the USB host, whereby data transfer can be performed by connecting portable instruments through point-to-point (peer-to-peer) connection. This enables a new added value to be produced for the USB interface, whereby new types of applications can be created.

3. Data Transfer Control Device

Figure 4:
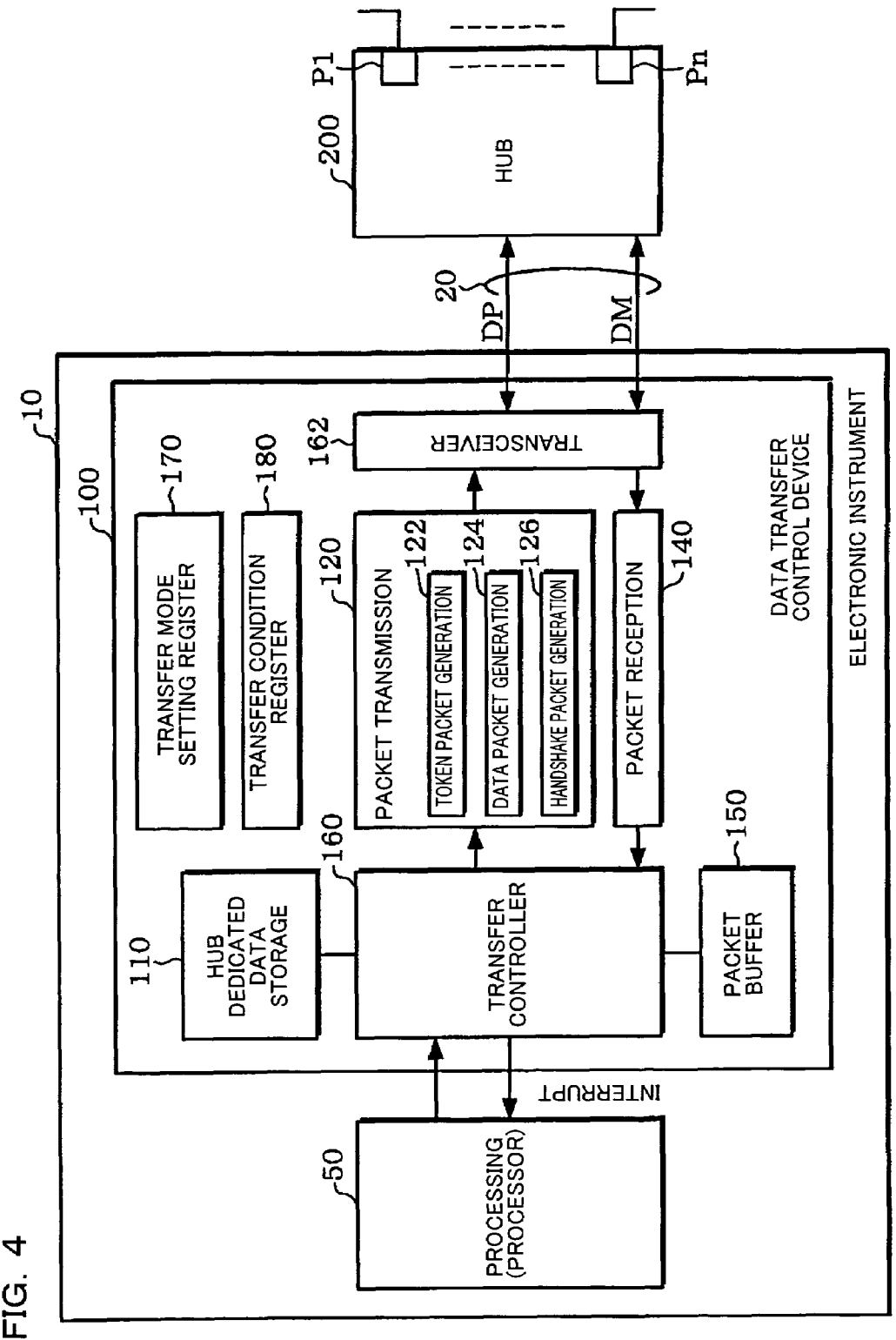
FIG. 4 is a block diagram showing the configuration of a data transfer control device according to one embodiment of the present invention.

FIG. 4 shows essential components of a data transfer control device according to one embodiment of the present invention. In FIG. 4, a hub 200 is connected with an electronic instrument 10 including a data transfer control device 100 in this embodiment. The electronic instrument 10 transfers data (packet) between the electronic instrument and the hub 200 through a bus 20. The data transfer is controlled by the data transfer control device 100 included in the electronic instrument 10. The hub 200 includes a plurality of ports P1 to Pn (n is an integer of two or more), each of which is connected with another electronic instrument (peripheral), and implements data transfer between the electronic instrument 10 and the electronic instrument connected to each port.

The electronic instrument 10 includes a processing section 50 and the data transfer control device 100. The processing section 50 controls the entire electronic instrument 10 including the data transfer control device 100. The processing section 50 includes an application device (device in the application layer) formed of an application specific integrated circuit (ASIC), a CPU (processor in a broad sense), a read only memory (ROM), and a random access memory (RAM). As the application device, a device which controls a hard disk drive or a media drive such as an optical disk drive, a device which controls a printer or a scanner, a device including an MPEG encoder and an MPEG decoder, and the like can be given.

Firmware (program) which controls the data transfer control device 100 may be operated on the CPU. The ROM in the processing section 50 stores a control program and various types of data. The RAM in the processing section 50 functions as a work area or a data storage region for the CPU and the data transfer control device 100.

The electronic instrument 10 may include a display section and an operating section. The display section of the electronic instrument 10 displays and outputs various types of information to the user. The operating section allows the user to operate the electronic instrument. As such an electronic instrument, various electronic instruments such as optical disk (CD-ROM and DVD) drives, magneto-optical (MO) disk drives, hard disk drives, TVs, TV tuners, VTRs, video cameras, audio devices, telephones, projectors, personal computers, electronic notebooks, PDAs, and word processors can be given.

The data transfer control device 100 includes a hub dedicated data storage section 110, a packet transmission section 120, a packet reception section 140, a packet buffer 150, a transfer controller 160, and a transceiver section 162.

The processing section 50 establishes a logical channel to a device connected through the bus 20. Specifically, the processing section 50 sets the transfer type, transfer direction, and amount of transfer performed between the data transfer control device 100 and the device, and the like. In the case where the hub 200 is connected with the bus 20 as shown in FIG. 4, the processing section 50 establishes a channel to a device connected to the port of the hub 200. Therefore, the processing section 50 must recognize a device connected to each port by grasping the state of the port of the hub 200.

Therefore, the data transfer control device 100 establishes a monitoring channel to the hub 200. The data transfer control device 100 periodically issues a token packet (or a token in a broad sense) to the hub 200, and captures the state of the hub 200 as a response packet (or a response data in a broad sense). The state of the hub 200 may be referred to as the use state or the connection state of the port of the hub 200, for example. The processing section 50 recognizes a device connected to each port of the hub 200 by analyzing a response packet captured in the data transfer control device 100, and establishes a channel.

The processing section 50 allocates resources to the hub or each device (or an endpoint) at one end of the channel established, and controls data transfer performed by the data transfer control device 100. Specifically, in the data transfer control device 100, the region of the packet buffer 150 is allocated to each endpoint.

The data transfer control device 100 in which the resources are allocated as described above transfers data between the data transfer control device 100 and the endpoint through the transceiver section 162 and the bus 20 by using the packet transmission section 120 and the packet reception section 140 controlled by the transfer controller 160. In more detail, the data transfer control device 100 transfers data by using the packet buffer 150. A plurality of pipe regions are allocated in the packet buffer 150, each of the pipe regions storing a packet (or data) transferred between the data transfer control device 100 and each endpoint. The data transfer control device 100 transfers data while writing or reading a packet into or from the region provided in the packet buffer 150 for each endpoint.

In the case where the endpoint is the hub 200, the data transfer control device 100 allocates the hub dedicated data storage section 110 to the endpoint. A packet (data in a broad sense) transferred from the hub 200 through the channel established to the hub 200 is stored in the hub dedicated data storage section 110.

The packet transmission section 120 includes a token packet generation section 122, a data packet generation section 124, and a handshake packet generation section 126. The token packet generation section 122 in the packet transmission section 120 cyclically (periodically) issues a token packet which queries the hub 200 about the presence or absence of a change in the state of the hub 200 as a token issuance section. The data packet generation section 124 generates a data packet. The data packet generated is transmitted through the bus 20 by the packet transmission section 120. The handshake packet generation section 126 generates a handshake packet. The handshake packet is transmitted through the bus 20 by the packet transmission section 120.

Upon receiving a token packet from the data transfer control device 100 through the bus 20, the hub 200 sends a response packet corresponding to the token packet. The response packet includes data which indicates that the state of the hub 200 has changed or remains unchanged. As the data which indicates that the state of the hub 200 remains unchanged, a negative acknowledgement (NAK) packet which indicates that the hub 200 does not have data to send can be given.

The response packet sent from the hub 200 is received by the packet reception section 140 of the data transfer control device 100 through the transceiver section 162. Specifically, the packet reception section 140 receives the response packet sent from the hub 200 corresponding to the token packet. The response packet received by the packet reception section 140 is analyzed by the transfer controller 160.

The transfer controller 160 judges whether or not the response packet sent from the hub 200 is a NAK packet (first packet) which indicates that the state of the hub 200 remains unchanged. If it is judged that the response packet is a NAK packet, the transfer controller 160 judges that the state of the hub 200 remains unchanged, and waits for reception of a response packet corresponding to a token packet to be issued next time. If it is judged that the response packet is not a NAK packet, the transfer controller 160 judges that the state of the hub 200 has changed. The transfer controller 160 writes the response packet into the hub dedicated data storage section 110, and generates an interrupt which indicates that the state of the hub 200 has changed to the processing section 50. The transfer controller 160 notifies the processing section 50 that the state of the hub 200 has changed by using the interrupt generated in this manner.

The processing section 50 which has received the interrupt generated by the transfer controller is controlled by the firmware. The processing section 50 reads the response packet stored in the hub dedicated data storage section 110, analyzes the change in the state of the hub 200, reconstructs a channel corresponding to the state of the hub 200 after change, manages occurrence of overcurrent in the device connected to the hub 200, or the like.

As described above, the hub dedicated data storage section 110 is provided in the data transfer control device 100. The hub dedicated data storage section 110 is allocated to data transfer performed through the channel established to monitor the hub instead of allocating the packet buffer 150. Specifically, the storage region of the hub dedicated data storage section 110 is provided in a region differing from the packet buffer 150. This makes it unnecessary to allocate limited general-purpose resources even though the state of the hub is changed with low frequency, whereby the resources can be effectively utilized. Moreover, since the packet which indicates that the state of the hub has changed is small in size, even if the hub dedicated data storage section 110 is formed by using hardware such as a register, the influence is small. Therefore, a considerable effect is obtained by effectively utilizing the resources even if the amount of hardware is increased.

The data transfer control device 100 may include a transfer mode setting register 170. In this case, data for instructing transfer in a hub dedicated transfer mode or transfer in a normal transfer mode is set in the transfer mode setting register 170 by the processing section 50, for example.

In the case where the data which instructs transfer control in the hub dedicated transfer mode is set in the transfer mode setting register 170, transfer through the channel established to the hub 200 is performed in the hub dedicated transfer mode. In transfer in the hub dedicated transfer mode, the hub dedicated data storage section 110 of the data transfer control device 100 is allocated as the resource. Specifically, the storage region of the hub dedicated data storage section 110 is allocated as the resource to interchange data with the hub which is the endpoint.

In the case where the data which instructs transfer control in the normal transfer mode is set in the transfer mode setting register 170, transfer through the channel established to the hub 200 is performed in the normal transfer mode. In transfer in the normal transfer mode, the packet buffer 150 of the data transfer control device 100 is allocated as the resource. Specifically, the storage region of the packet buffer 150 is allocated as the resource to interchange data with the hub which is the endpoint.

This enables the hub dedicated data storage section 110 to be allocated as the resource only in the case where the channel is established to the hub without allocating the general-purpose packet buffer 150 as the resource, whereby the resources can be effectively utilized.

The data transfer control device 100 may include a transfer condition register 180. The transfer condition register 180 has an instruction bit for instructing start of data transfer using the hub dedicated data storage section 110.

The packet transmission section 120 issues (or transmits) a token packet when the instruction bit is active. The packet transmission section 120 cyclically issues a token packet as a token issuance section until the instruction bit becomes inactive after the instruction bit has become active. Control of the processing section 50 for an interrupt with low frequency can be simplified by monitoring the hub 200 as described above.

4. Configuration Example of Data Transfer Control Device

A specific configuration is described below taking the case where the data transfer control device 100 in this embodiment controls data transfer conforming to the USB OTG standard as an example. In this case, the data transfer control device 100 monitors a change in the state of the hub 200 when the data transfer control device 100 operates as the host.

The hub 200 is described below.

Figure 5:
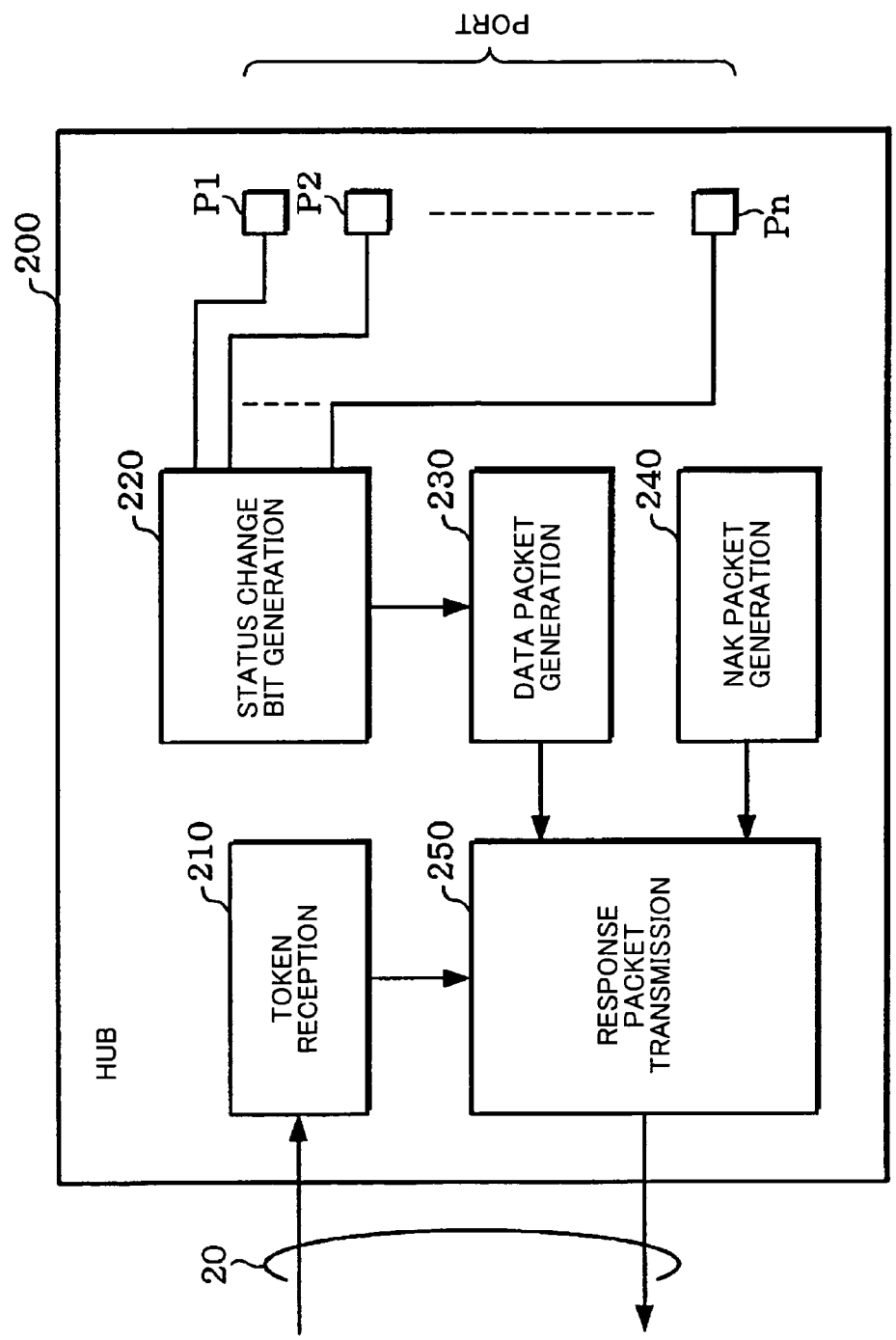
FIG. 5 is a block diagram showing the configuration a hub.

FIG. 5 is a block diagram showing the configuration of the hub 200. The hub 200 functions as a hub in the USB standard, and is connected with the data transfer control device 100 through the bus 20, as shown in FIG. 4.

The hub 200 includes the ports P1 to Pn. A device is connected to each port through the USB (or a bus). The hub 200 includes a token reception section 210, a status change bit generation section 220, a data packet generation section 230, a negative acknowledgement (NAK) packet generation section 240, and a response packet transmission section 250.

The token reception section 210 receives a token packet sent from the data transfer control device 100. In the data transfer control device 100 conforming to the USB standard, the packet transmission section 120 issues a token packet of which the transfer type is interrupt transfer and the transfer direction is the IN direction as described later.

The status change bit generation section 220 generates status change bits which indicate the state of the change in the state of the hub 200. The state of the hub 200 may be referred to as the states of the ports P1 to Pn. When a cable is inserted into a port or a cable is removed from a port, the status change bits indicate that the state of the port has changed.

Figure 6:
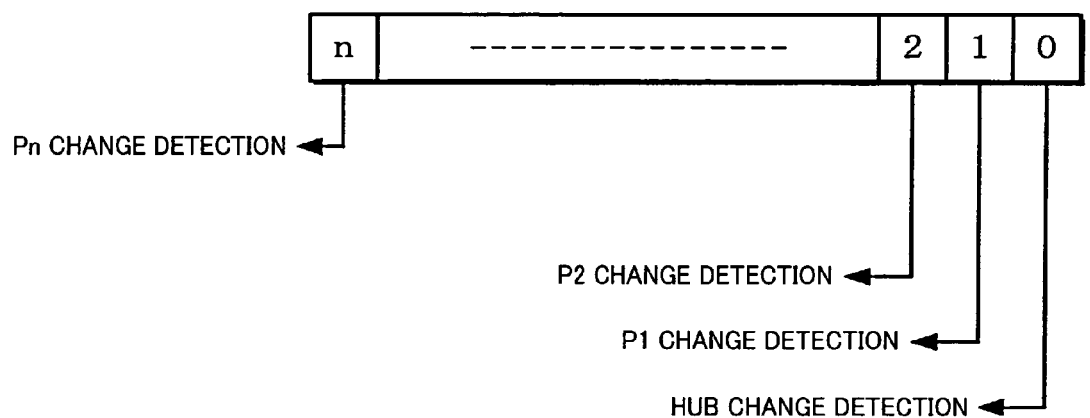
FIG. 6 is a diagram showing the configuration of status change bits.

FIG. 6 is a diagram for illustrating the status change bits. The status change bits include a change detection bit which is set at "1" when a change in each port is detected, and a hub change detection bit which indicates that the state of the hub 200 has changed. For example, whether or not the state of the hub has changed can be judged by the hub change detection bit. A port which has changed can be judged by the hub change detection bit.

The number of ports of the hub 200 is recognized by the data transfer control device 100 by using a hub descriptor when establishing a channel to the hub 200. Therefore, a port which has changed can be easily judged by the status change bits handled in a byte length unit, even if the number of ports of the hub 200 is not a multiple of eight.

In FIG. 5, the data packet generation section 230 generates a response packet including the status change bits generated by the status change bit generation section 220 as a response packet corresponding to the token packet received by the token reception section 210.

The NAK packet generation section 240 generates a NAK packet. A NAK packet is sent in the case where the hub 200 does not have data to transfer corresponding to the token packet from the data transfer control device 100 received by the token reception section 210.

The response packet transmission section 250 transmits a response packet generated by the data packet generation section 230 or a NAK packet generated by the NAK packet generation section 240 to the data transfer control device 100 through the bus 20 corresponding to the token packet received by the token reception section 210.

Figure 7:
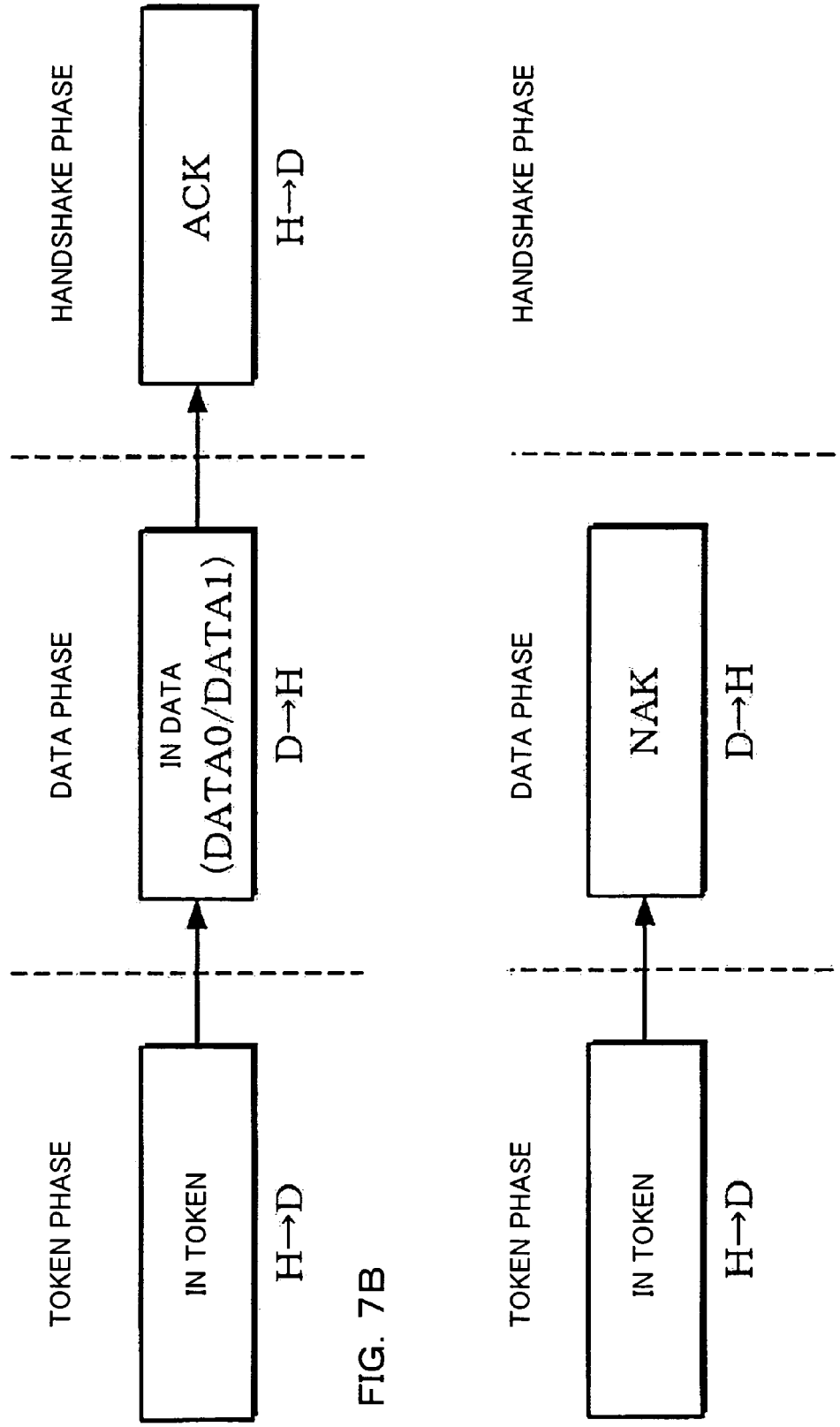
FIGS. 7A and 7B are diagrams for illustrating transaction of interrupt IN transfer.

FIGS. 7A and 7B are diagrams for illustrating transactions performed between the data transfer control device 100 and the hub 200. FIG. 7A schematically shows an example of a transaction performed when the state of the hub 200 has changed. FIG. 7B schematically shows an example of a transaction performed when the state of the hub 200 remains unchanged.

In the USB standard, when the data transfer control device 100 queries the hub 200 about the change in the state of the hub 200, interrupt transfer in the IN direction is used. The interrupt transfer is divided into three phases consisting of a token phase, a data phase, and a handshake phase in principle. A packet specified in the USB standard is transferred in each phase. A USB packet starts with a SYNC field and ends with end-of-packet (EOP).

In the token phase, the data transfer control device 100 transmits an IN token packet to the hub 200. The IN token packet includes a packet identifier field PID, an address field ADDR, an endpoint field ENDP, and cyclic redundancy check (CRC). An endpoint is specified by the address field ADDR and the endpoint field ENDP. The transfer direction is indicated by the packet identifier field PID.

If the state of the hub 200 has changed, the hub 200 which received the IN token packet from the data transfer control device 100 sends IN data as a response packet in the data phase. The IN data includes a packet identifier field PID, a data field DATA, and CRC. A DATA0 identifier and a DATA1 identifier are alternately assigned to the packet identifier field PID. A packet including the status change bits shown in FIG. 6 is set in the data field DATA.

The data transfer control device 100 which has received the IN data from the hub 200 sends a positive acknowledge (ACK) packet to the hub 200 in the handshake phase. The data transfer control device 100 notifies the hub 200 that the IN data has been received normally by sending the ACK packet. The ACK packet consists only of a packet identifier field PID. An identifier which indicates that the packet is an ACK packet is set in the packet identifier field PID.

If the state of the hub 200 remains unchanged, the hub 200 which has received the IN token packet from the data transfer control device 100 sends a NAK packet as a response packet in the data phase, as shown in FIG. 7B. The NAK packet is generated by the NAK packet generation section 240 shown in FIG. 5. The hub 200 notifies the data transfer control device 100 that there is no data to send by sending the NAK packet. The NAK packet consists only of a packet identifier field PID in the same manner as the ACK packet. An identifier which indicates that the packet is a NAK packet is set in the packet identifier field PID.

A detailed configuration example of the data transfer control device 100 which can monitor the hub 200 as shown in FIG. 5 and conforms to the USB OTG standard is described below.

Figure 8:
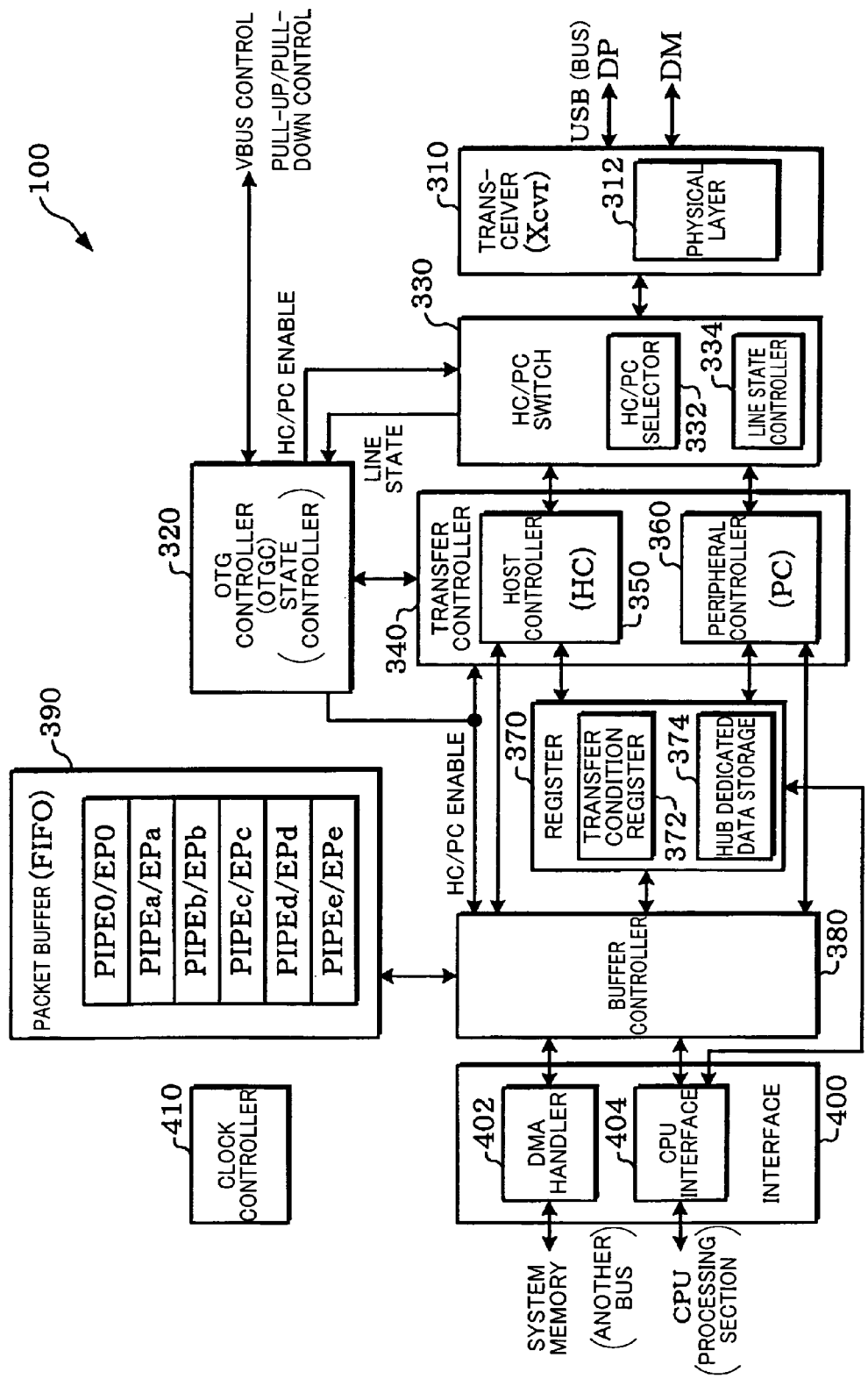
FIG. 8 is a diagram showing detailed configuration a data transfer control device according to one embodiment of the present invention.

FIG. 8 is a diagram showing the configuration of the data transfer control device 100.

The data transfer control device 100 includes a transceiver 310, an OTG controller 320, an HC/PC switch circuit 330, a transfer controller 340, a register section 370, a buffer controller 380, a packet buffer 390, an interface circuit 400, and a clock controller 410. The data transfer control device 100 does not necessarily include all the circuit blocks shown in FIG. 8. Some of the circuit blocks may be omitted.

The functions of the packet transmission section 120, the packet reception section 140, and the transfer controller 160 shown in FIG. 4 are implement by the transfer controller 340. The function of the transceiver section 162 shown in FIG. 4 is implemented by the transceiver 310, the HC/PC switch circuit 330, and the transfer controller 340. The function of the hub dedicated data storage section 110 shown in FIG. 4 is implemented by the register section 370. The function of the packet buffer 150 shown in FIG. 4 is implemented by the packet buffer 390. The functions of the transfer mode setting register 170 and the transfer condition register 180 shown in FIG. 4 are implemented by the register section 370.

The transceiver 310 (hereinafter appropriately called "Xcvr") is a circuit which transmits and receives data transferred conforming to the USB standard by using differential data signals DP and DM, and includes a USB physical layer (PHY) circuit 312. In more detail, the transceiver 310 generates the line state (J, K, SE0, or the like) of the data signal lines DP and DM, and performs serial/parallel conversion, parallel/serial conversion, bit stuffing, bit unstuffing, NRZI decoding, NRZI encoding, and the like. The transceiver 310 may be provided outside the data transfer control device.

The OTG controller 320 (state controller in a broad sense; hereinafter appropriately called "OTGC") performs various types of processing for implementing the SRP function and the HNP function in the OTG standard (see FIGS. 3A and 3B). Specifically, the OTG controller 320 controls the host operation or the peripheral operation by transition between a plurality of states including a state of the host operation which operates in the role of the host, a state of the peripheral operation which operates in the role of the peripheral, and the like, and controls switching between the host operation and the peripheral operation by the state transition.

In more detail, the OTG standard defines state transition of the dual-role device during the operation as the A-device and the operation as the B-device (see FIGS. 2B and 2C). The OTG controller 320 includes a state machine for implementing the state transition. The OTG controller 320 includes a circuit which detects (or monitors) the USB data line state, the VBUS level, and the ID pin state. The state machine included in the OTG controller 320 changes the state (for example, a state of a host, peripheral, suspend or idle) based on the detected information. In this case, the state transition may be implemented by hardware, or allowing the firmware to set a state command in the register. When the state transition occurs, the OTG controller 320 controls VBUS or controls connection or disconnection of the pull-up resistor or the pull-down resistor of the data signal lines DP and DM based on the state after transition. The OTG controller 320 enables or disables a host controller 350 (hereinafter appropriately called "HC") and a peripheral controller 360 (hereinafter appropriately called "PC") included in the transfer controller 340.

The HC/PC switch circuit 330 (or HC/PC common circuit) switches connection between the transceiver 310 and the host controller 350 or the peripheral controller 360. The HC/PC switch circuit 330 instructs the transceiver 310 to generate the line state of USB data (DP, DM). The connection switch control is implemented by using an HC/PC selector 332. The instruction for line state generation is implemented by using a line state controller 334.

When the OTG controller 320 activates an HC enable signal during the host operation (or in the host state), the HC/PC switch circuit 330 (HC/PC selector 332) connects the transceiver 310 with the host controller 350. When the OTG controller 320 activates a PC enable signal during the peripheral operation (or in the peripheral state), the HC/PC switch circuit 330 connects the transceiver 310 with the peripheral controller 360. This enables the host controller 350 and the peripheral controller 360 to be operated exclusively.

The transfer controller 340 is a circuit which controls data transfer through the USB (or a bus in a broad sense), and includes the host controller 350 (HC) and the peripheral controller 360 (PC).

The host controller 350 is a circuit which controls data transfer in the role of the host during the host operation (when the HC enable signal from the OTG controller 320 is active).

Specifically, the host controller 350 is connected with the transceiver 310 by the HC/PC switch circuit 330 during the host operation. The host controller 350 generates a transaction to an endpoint based on transfer condition information set in the transfer condition register section 372 in the register section 370. The host controller 350 transfers data (packet) between a pipe region (PIPE0 to PIPEe; hereinafter appropriately called "PIPE") allocated in the packet buffer 390 and an endpoint corresponding to the pipe region.

In more detail, the host controller 350 arbitrates between pipe transfers and performs frame time management, transfer scheduling, resend management, or the like. The host controller 350 manages transfer condition information (or operation information) of pipe transfer through the register section 370. The host controller 350 manages transactions, assembles or disassembles a packet, and instructs generation of a suspend state, resume state, or reset state.

The peripheral controller 360 is a circuit which controls data transfer in the role of the peripheral during the peripheral operation (when the PC enable signal from the OTG controller 320 is active).

Specifically, the peripheral controller 360 is connected with the transceiver 310 by the HC/PC switch circuit 330 during the peripheral operation. The peripheral controller 360 transfers data between an endpoint region (EP0 to EPe, hereinafter appropriately called "EP") allocated in the packet buffer 390 and the host based on the transfer condition information set in the transfer condition register section 372 in the register section 370.

In more detail, the peripheral controller 360 manages transfer condition information (or operation information) of endpoint transfer through the register section 370. The peripheral controller 360 manages transactions, assembles or disassembles a packet, and instructs generation of a remote wakeup signal.

An endpoint is a point (or a portion) on the peripheral (or a device) to which a unique address can be assigned. Data transfer between the host and the peripheral (or a device) is performed through the endpoint. A transaction is made up of a token packet, an optional data packet, and an optional handshake packet.

The register section 370 includes various registers for performing data transfer (or pipe transfer or endpoint transfer) control, buffer access control, buffer management, interrupt control, block control, DMA control, and the like. The registers included in the register section 370 may be implemented by using a memory such as a RAM, a D flip-flop, or the like. The registers in the register section 370 may not be positioned together, but may be dispersed in each block (HC, PC, OTGC, Xcvr, and the like).

The register section 370 includes the transfer condition register section 372 and a hub dedicated data storage section 374. The transfer condition register section 372 includes a register for storing transfer condition information (or transfer control information) on data transfer between the endpoint and the pipe region (PIPE0 to PIPEe) allocated in the packet buffer 390 during the host operation. The transfer mode setting register 170 shown in FIG. 4 may be included as a register which stores the transfer condition information. The transfer condition register is provided corresponding to each pipe region in the packet buffer 390.

The endpoint regions (EP0 to EPe) are allocated in the packet buffer 390 during the peripheral operation. Data is transferred between the data transfer control device and the host based on the transfer condition information set in the transfer condition register section 372.

The hub dedicated data storage section 374 buffers data (or a packet) transferred between the data transfer control device and the hub which is an endpoint during the host operation as a region physically differing from the pipe region allocated in the packet buffer 390.

The buffer controller 380 (or FIFO manager) controls access (read/write) to the packet buffer 390 and performs region management. In more detail, the buffer controller 380 generates and manages the access address of the packet buffer 390 by the CPU (or a processing section in a broad sense), DMA, and USB. The buffer controller 380 arbitrates between accesses to the packet buffer 390 by the CPU, DMA, and USB.

For example, the buffer controller 380 sets (or establishes) a data transfer path between the interface circuit 400 (CPU or DMA) and the packet buffer 390, and a data transfer path between the packet buffer 390 and the host controller 350 (or USB) during the host operation.

The buffer controller 380 sets a data transfer path between the interface circuit 400 (or CPU or DMA) and the packet buffer 390, and a data transfer path between the packet buffer 390 and the peripheral controller 360 (or USB) during the peripheral operation.

The packet buffer 390 (or FIFO, packet memory or buffer) temporarily stores (or buffers) data transferred through the USB (or transmission data or reception data). The packet buffer 390 may be formed by using a RAM, for example. The packet buffer 390 may be provided outside the data transfer control device (or may be an external memory).

The packet buffer 390 is used as a pipe transfer first-in first-out (FIFO) during the host operation. Specifically, the pipe regions PIPE0 to PIPEe (or a buffer regions in a broad sense) are allocated in the packet buffer 390 corresponding to each endpoint of the USB (or a bus). Data (or transmission data or reception data) transferred between each pipe region and each endpoint corresponding to each pipe region is stored in the pipe regions PIPE0 to PIPEe.

The buffer region allocated in the packet buffer 390 (or a region assigned to the pipe region during the host operation and assigned to the endpoint region during the peripheral operation) is assigned to a storage region in which information input first is output first (FIFO region).

The pipe region PIPE0 is a pipe region dedicated to the endpoint 0 for control transfer. The pipe regions PIPEa to PIPEe are general-purpose pipe regions which can be assigned to arbitrary endpoints.

In the USB standard, the endpoint 0 is assigned to an endpoint dedicated to control transfer. Therefore, confusion by the user can be avoided by assigning the pipe region PIPE0 to the pipe region dedicated to control transfer as in this embodiment. Moreover, the pipe region corresponding to the endpoint can be dynamically changed by assigning the pipe regions PIPEa to PIPEe to pipe regions which can be assigned to arbitrary endpoints. This enables the degrees of freedom relating to pipe transfer scheduling to be increased, whereby efficiency of data transfer can be increased.

In this embodiment, the buffer region for monitoring the hub connected to the USB is set in the hub dedicated data storage section 110 which physically differs from the packet buffer 390 during the host operation. This prevents the pipe region allocated in the packet buffer 390 from being used uselessly.

The interface circuit 400 is a circuit for transferring data between the DMA (or a system memory) bus or the CPU bus, which is a bus differing from the USB, and the packet buffer 390. The interface circuit 400 includes a DMA handler circuit 402 for performing DMA transfer between the packet buffer 390 and an external system memory. The interface circuit 400 also includes a CPU interface circuit 404 for performing parallel I/O (PIO) transfer between the packet buffer 390 and an external CPU. The CPU (or a processing section) may be included in the data transfer control device 100.

The clock controller 410 generates various clock signals used in the data transfer control device based on a built-in PLL or an external input clock signal.

4.1 Pipe Region and Endpoint Region

In this embodiment, the pipe regions PIPE0 to PIPEe are allocated in the packet buffer 390 during the host operation, as shown in FIG. 9A. Data (or a packet) is transferred between each of the pipe regions PIPE0 to PIPEe and each endpoint of the peripheral.

The meaning of the "pipe" of the pipe region in the embodiments of the present invention differs to some extent from the "pipe" defined in the USB standard (that is a logical abstraction or a logical path representing the association between an endpoint on a device and software in a host).

As shown in FIG. 9A, the pipe region in this embodiment is allocated in the packet buffer 390 corresponding to each endpoint of the peripheral connected to the USB (bus). In FIG. 9A, the pipe region PIPEa corresponds to an endpoint 1 (bulk IN) of a peripheral 1, and the pipe region PIPEb corresponds to an endpoint 2 (bulk OUT) of the peripheral 1. The pipe region PIPEc corresponds to an endpoint 1 (bulk IN) of a peripheral 2, and the pipe region PIPEd corresponds to an endpoint 2 (bulk OUT) of the peripheral 2. The pipe region PIPEe corresponds to an endpoint 1 (interrupt IN) of a peripheral 3. The pipe region PIPE0 is a pipe region dedicated to an endpoint 0 for control transfer. The hub dedicated data storage section 374 is a pipe region which has the hub 200 as an endpoint (interrupt IN) and is exclusively assigned to the hub.

In the example shown in FIG. 9A, USB bulk IN transfer is performed between the pipe region PIPEa and the endpoint 1 of the peripheral 1, and bulk OUT transfer is performed between the pipe region PIPEb and the endpoint 2 of the peripheral 1. Bulk IN transfer is performed between the pipe region PIPEc and the endpoint 1 of the peripheral 2, and bulk OUT transfer is performed between the pipe region PIPEd and the endpoint 2 of the peripheral 2. Interrupt IN transfer is performed between the pipe region PIPEe and the endpoint 1 of the peripheral 3. Interrupt IN transfer is performed between the hub dedicated data storage section 374 and the hub 200.

As described above, arbitrary data transfer (or isochronous transfer, bulk transfer, or interrupt transfer) can be performed between the (general-purpose) pipe region and an endpoint corresponding to the pipe region. In the case where the hub 200 is an endpoint, interrupt transfer can be performed between the hub dedicated pipe region and the hub 200.

In this embodiment, data in a given data unit (or data unit indicated by the total size) is transferred between the pipe region and an endpoint corresponding to the pipe region. As the data unit, a data unit of which transfer is requested by an I/O request packet (IRP), a data unit obtained by dividing this data unit into an appropriate size, and the like can be given. Data transfer in this data unit (or series of transactions) to the endpoint may be referred to as the "pipe" in this embodiment.

A region in which data (or transmission data or reception data) of the "pipe" is stored is the pipe region.

After transfer in a given data unit using the general-purpose pipe region has finished, the pipe region may be released. The released general-purpose pipe region may be assigned to an arbitrary endpoint. In this embodiment, correspondence between the pipe region and the endpoint can be dynamically changed.

The endpoint regions EP0 to EPe are allocated (or set) in the packet buffer 390 during the peripheral operation, as shown in FIG. 9B. Data is transferred between each of the endpoint regions EP0 to EPe and the host (including a host controller and system memory).

As described above, the buffer region of the packet buffer 100 is assigned to the pipe region during the host operation and is assigned to the endpoint region during the peripheral operation. This enables the resources of the packet buffer 390 to be shared (or used in common) during the host operation and the peripheral operation, whereby the use storage capacity of the packet buffer 390 can be saved.

The number of pipe regions and endpoint regions is not limited to six. The number of pipe regions and endpoint regions may be arbitrary.

4.2 Detailed Configuration of a Block

A detailed configuration of each block is described below.

4.2.1 OTG Controller

Figure 10:
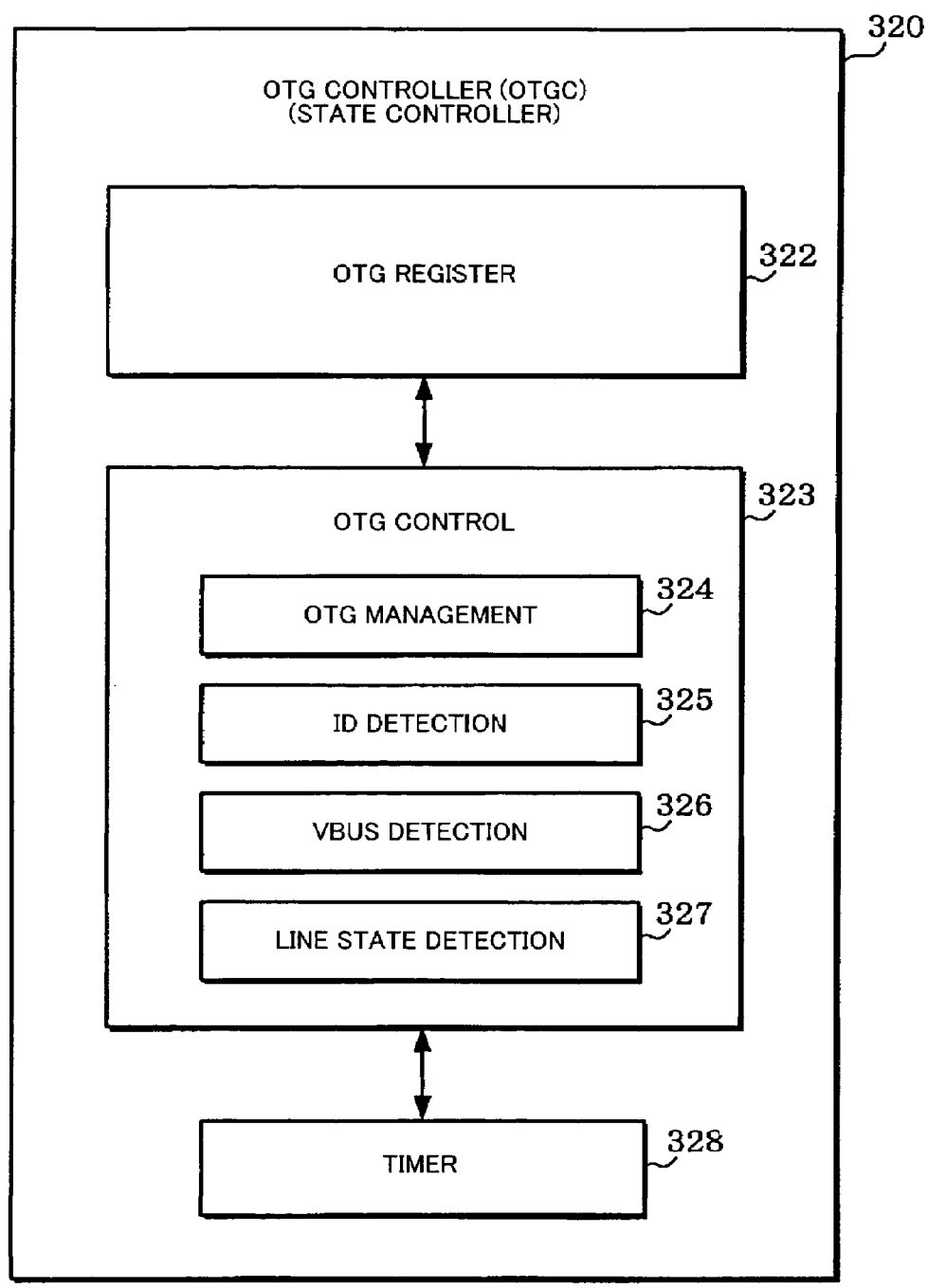
FIG. 10 is a block diagram showing the configuration of an OTG controller.

FIG. 10 is a diagram showing the configuration of the OTG controller 320.

The OTG controller 320 includes an OTG register section 322. The OTG register section 322 includes a monitor register and a control register for the OTG controller 320. The OTG register section 322 also includes a circuit which decodes an OTG state command written by the firmware (CPU).

The OTG controller 320 includes an OTG control circuit 323. The OTG control circuit 323 includes an OTG management circuit 324 which manages the OTG state, an ID detection circuit 325 which detects the voltage level of the ID pin, and a VBUS detection circuit 326 which detects the voltage level of VBUS. The OTG control circuit 323 also includes a line state detection circuit 327 which detects the USB bus state (such as reset or resume) based on line state information from the transceiver 310 (such as J, K, or SE0).

The OTG controller 320 includes a timer 328 which measures time. The line state detection circuit 327 detects the USB bus state based on the line state information from the transceiver 310 and the time measurement information from the timer 328.

Information which must be detected for transitioning the OTG state is the voltage levels of ID and VBUS and the line state of the data signal lines DP/DM. The OTG controller 320 detects the information and transfers it to the firmware (CPU) through the monitor register.

The firmware transitions the state based on the detected information, and notifies the OTG controller 320 of the next transition state by using the OTG state command.

The OTG controller 320 decodes the OTG state command and controls VBUS drive, connection of the pull-up/pull-down resistors, and the like based on the decoded result, thereby implementing SRP or HNP described with reference to FIGS. 3A and 3B.

As described above, the OTG controller 320 takes charge of OTG control in each state, and the firmware concentrates on the management of state transition. As a result, the processing load of the firmware (or CPU) can be reduced in comparison with the case of implementing the entire state control by using the firmware. Moreover, efficient firmware development can be enabled.

A hardware circuit may judge the OTG state transition instead of the firmware. Almost the entire processing of the OTG controller 320 (processing other than VBUS control, pull-up/pull-down resistor control, ID detection, VBUS detection, line state detection, and the like) may be implemented by firmware (or software).

4.2.2 Host Controller

Figure 11:
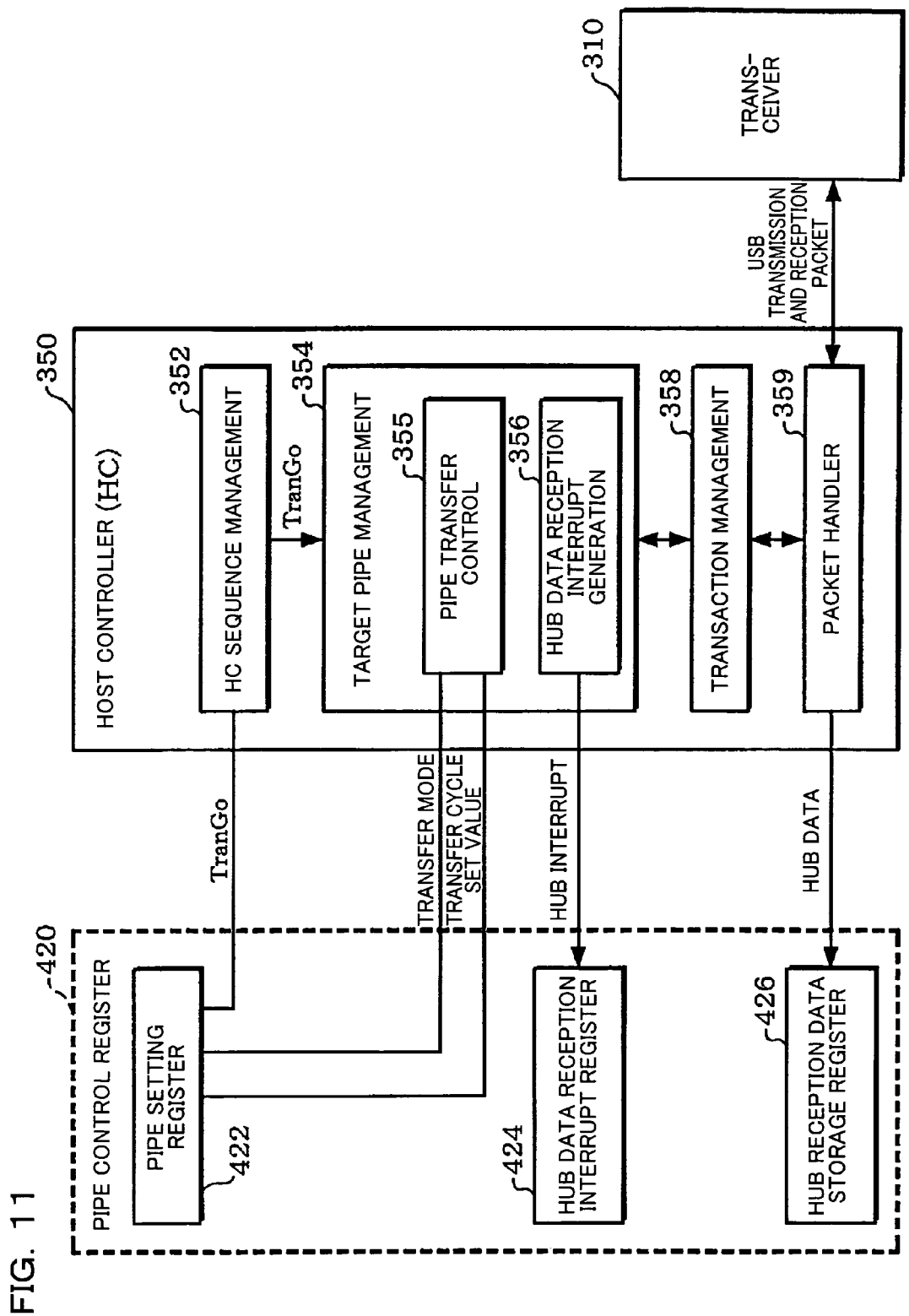
FIG. 11 is a diagram showing the configuration of a host controller.

FIG. 11 is a diagram showing the configuration of the host controller 350. FIG. 11 also shows a logical connection relationship between the host controller 350 and the transceiver 310 and the register section 370.

The register section 370 includes a pipe control register section 420 for controlling pipe transfer to the pipe x (x is 0 or any of a to e). The pipe control register section 420 includes a pipe setting register 422. The pipe setting register 422 outputs a transaction start signal TranGo which starts a transaction of the pipe x to the host controller 350 when given data is set in a predetermined field by the firmware. The normal transfer mode or the hub dedicated transfer mode is set in the pipe setting register 422 by the firmware, and a transfer mode signal corresponding to the set transfer mode is output to the host controller 350. Specifically, the pipe setting register 422 functions as the transfer mode setting register 170 shown in FIG. 4. The transfer cycle of interrupt transfer for monitoring the hub is set in the pipe setting register 422 by the firmware, and a transfer mode signal corresponding to the transfer cycle set value is output to the host controller 350.

The pipe control register section 420 includes a hub data reception interrupt register 424 and a hub reception data storage register 426. If a hub interrupt signal is set in the hub data reception interrupt register 424 by the host controller 350, a hub data reception interrupt is generated for the firmware, whereby the firmware can be notified that the state of the hub monitored has changed. At least the status change bits for detecting the change in the state of the hub included in the response packet sent from the hub monitored are stored in the hub reception data storage register 426. Specifically, the hub reception data storage register 426 functions as the hub dedicated data storage section 10 shown in FIG. 4 or the hub dedicated data storage section 374 shown in FIG. 8. The firmware (or CPU) can recognize the change in the state of the hub by reading the status change bits stored in the hub reception data storage register 426.

In the pipe control register section 420, it is preferable that the transfer type of the pipe x be fixed to interrupt transfer and the transfer direction be fixed in the IN direction (interrupt IN transfer) after the hub dedicated transfer mode has been set in the pipe control register section 420.

The pipe control register section 420 having the above configuration may be provided for each pipe, or may be provided for one of the pipe 0 and the pipes a to e.

The host controller 350 using the pipe control register section 420 having the above configuration includes an HC sequence management circuit 352. The HC sequence management circuit 352 mediates between pipe transfers (or data transfers using the pipe regions) and performs time management, pipe transfer scheduling, resend management, and the like.

In more detail, the HC sequence management circuit 352 counts the frame number, issues instructions for transmission of a start-of-frame (SOF) packet, and the like. The HC sequence management circuit 352 also performs processing of preferentially executing isochronous transfer at the head in each frame, and processing of preferentially handling interrupt transfer after the isochronous transfer. The HC sequence management circuit 352 performs processing of issuing instructions for each pipe transfer according to the order of pipe transfers. The HC sequence management circuit 352 manages the number of continuous execution times of transactions and confirms the remaining frame time. The HC sequence management circuit 352 processes the handshake packet (ACK or NAK) sent from a peripheral. The HC sequence management circuit 352 also performs error processing during transactions.

The host controller 350 includes a target pipe management circuit 354. The target pipe management circuit 354 performs handling processing of the transfer condition information set in the transfer condition register in the register section 370 and the like. The target pipe management circuit 354 issues instructions for transfer to a transaction management circuit 358.

In more detail, the target pipe management circuit 354 selects the transfer condition information and generates an interrupt signal. The target pipe management circuit 354 includes a pipe transfer control circuit 355 and a hub data reception interrupt generation circuit 356.

If the hub dedicated transfer mode is set in the pipe setting register 422, the pipe transfer control circuit 355 periodically performs interrupt IN transfer in the transfer cycle set in the pipe setting register 422. The hub data reception interrupt generation circuit 356 analyzes a packet received through the transaction management circuit 358, generates a hub interrupt if it is judged that the state of the hub has changed, and sets a hub interrupt signal in the hub data reception interrupt register 424.

The host controller 350 includes the transaction management circuit 358. The transaction management circuit 358 manages the type of the packet to be transferred and the order of transfer (or transaction sequence management). The transaction management circuit 358 monitors timeouts. The transaction management circuit 358 advises completion of transactions.

The host controller 350 includes a packet handler circuit 359. The packet handler circuit 359 assembles or disassembles a packet. The packet handler circuit 359 checks PID and decodes or encodes CRC. The packet handler circuit 359 reads or writes the payload of the packet in the buffer region and transmits an SOF packet. The packet handler circuit 359 counts transmission and reception data.

A response packet from the hub received corresponding to the IN token transmitted to the hub is subjected to a PID check by the packet handler circuit 359. If it is judged that the response packet is a NAK packet, the host controller 350 waits for reception of the next response packet without processing the response packet. If it is judged that the response packet subjected to a PID check by the packet handler circuit 359 is not a NAK packet, the response packet is stored in the hub reception data storage register 426 as hub data.

Figure 12:
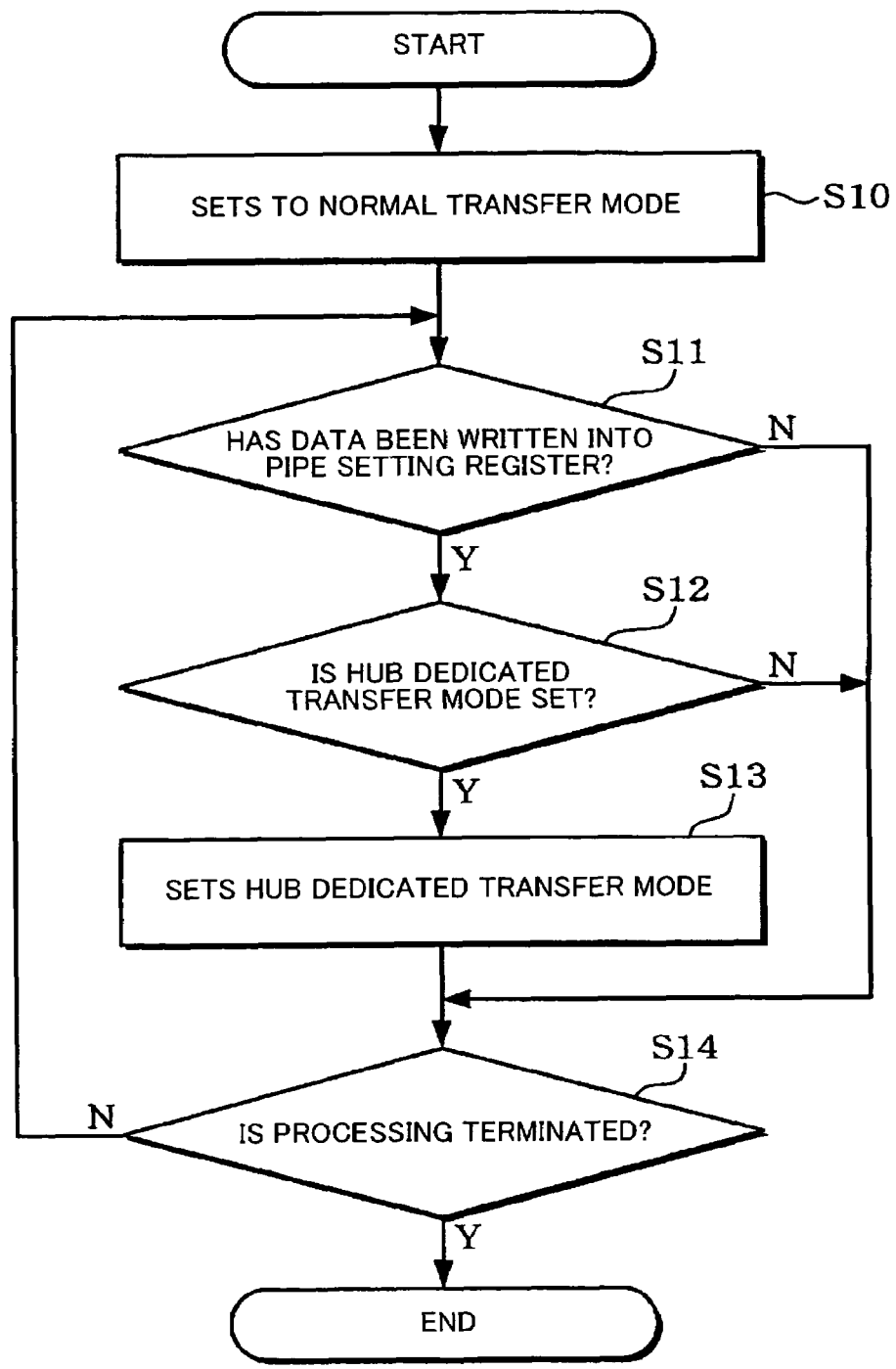
FIG. 12 is a flowchart showing an outline of a transfer mode setting operation of a host controller.

FIG. 12 is a flowchart showing an outline of the transfer mode setting operation of the host controller 350.

In the initial state of the host controller 350, pipe transfer of the pipe x is set in the normal transfer mode (step S10).

If data has been written into the pipe setting register 422 by the firmware (step S11: Y), if the written data is data for setting the transfer mode in the hub dedicated transfer mode (step S12: Y), pipe transfer of the pipe x is set in the hub dedicated transfer mode (step S13). A series of processing is terminated (END) on condition that given finish conditions, such as input of a reset signal, are satisfied (step S14: Y).

If data is not written into the pipe setting register 422 in the step S11 (step S11: N), or if the data written into the pipe setting register 422 is not data for setting the transfer mode in the hub dedicated transfer mode in the step S12 (step S12: N), the processing proceeds to the step S14. If given finish conditions are not satisfied (step S14: N), the processing returns to the step S11.

Figure 13:
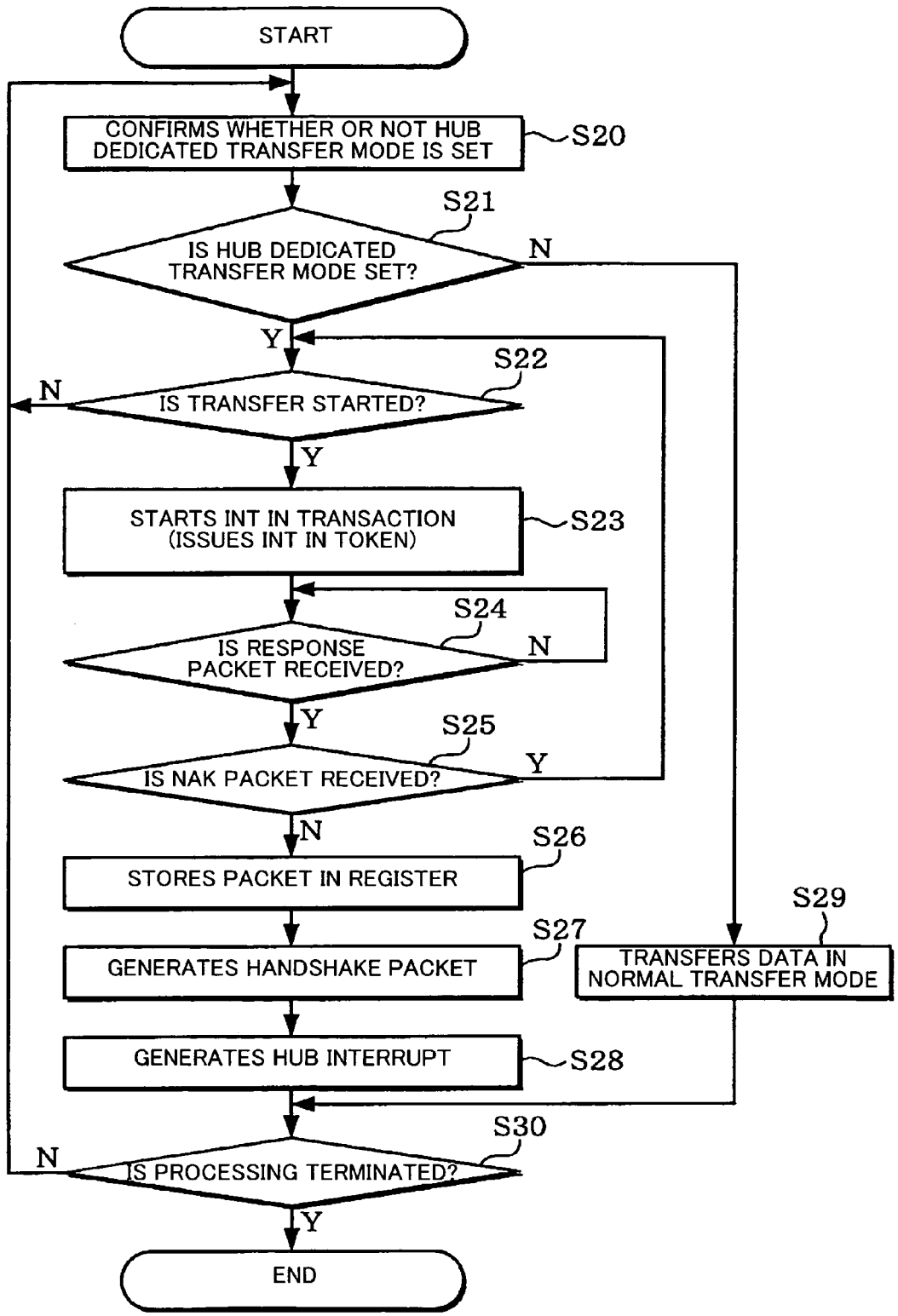
FIG. 13 is a flowchart showing an outline of an operation of a host controller in a hub dedicated transfer mode.

FIG. 13 is a flowchart showing outline of the operation of the host controller 350 in the hub dedicated transfer mode.

First, it is confirmed whether or not the transfer mode is the hub dedicated transfer mode (step S20). If pipe transfer of the pipe x is set in the hub dedicated transfer mode in the pipe setting register 422 (step S21: Y), the target pipe management circuit 354 starts a transaction of interrupt IN transfer (step S23) on condition that the transaction start signal TranGo is set in the pipe setting register 422 and the instruction bit for instructing start of data transfer of the pipe x is active in the transfer condition register (step S22: Y). This causes an interrupt IN token packet to be issued. The pipe transfer control circuit 355 performs interrupt IN transfer by periodically starting a transaction at the transfer cycle set value set in the pipe setting register 422 until the instruction bit in the transfer condition register becomes inactive.

The packet handler circuit 359 waits for reception of a response packet from the hub through the transceiver 310 (step S24: N). When the packet handler circuit 359 receives a response packet (step S24: Y), the packet handler circuit 359 judges whether or not the response packet is a NAK packet (first packet) (step S25).

If it is judged that the received packet is a NAK packet (step S25: Y), the processing returns to the step S22.

If it is judged that the received packet is not a NAK packet (step S25: N), the packet handler circuit 359 stores the received packet in the hub reception data storage register 426 (step S26). The packet handler circuit 359 notifies the transaction management circuit 358 and the target pipe management circuit 354 to that effect.

The transaction management circuit 358 issues a handshake packet (step S27), and the target pipe management circuit 354 generates a hub interrupt using the hub data reception interrupt generation circuit 356 (step S28).

When pipe transfer of the pipe x is not set in the hub dedicated transfer mode in the pipe setting register 422 in the step S21 (step S21: N), data transfer conforming to the USB OTG standard is performed in the normal transfer mode (step S29).

After the steps S28 and S29, a series of processing is terminated (END) on condition that given finish conditions such as input of a reset signal are satisfied (step S30: Y). If the given finish conditions are not satisfied in the step S30 (step S30: N), or if the instruction bit in the transfer condition register becomes inactive in the step S22 (step S22: N), the processing returns to the step S20.

In this embodiment, since only the hub reception data storage register 426 is used to monitor the hub in the hub dedicated transfer mode, it is unnecessary to allocate the resources of the packet buffer 390.

Figure 14:
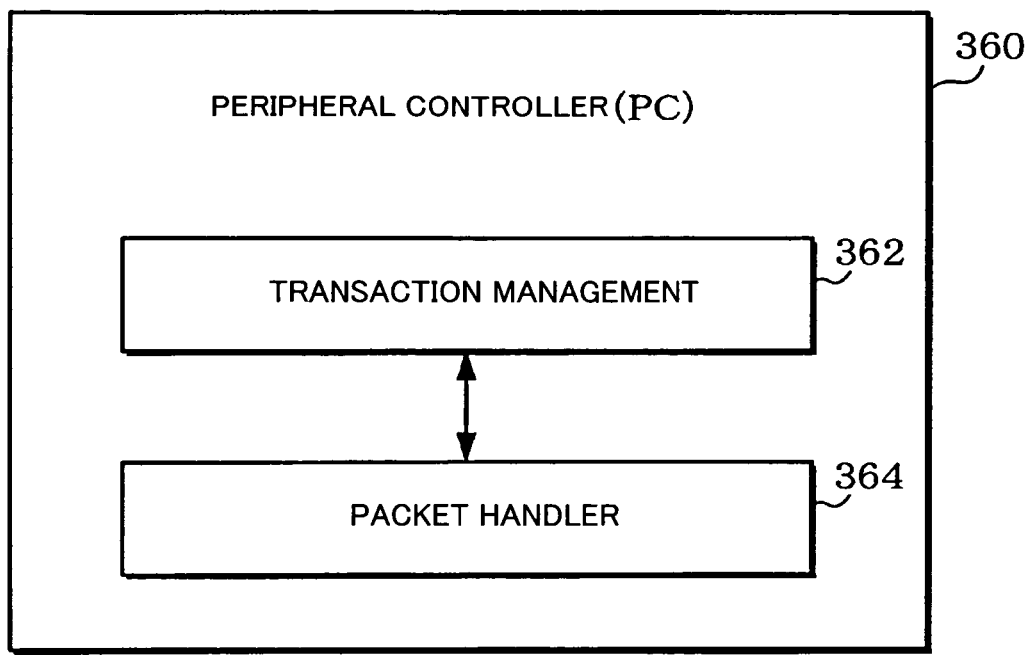
FIG. 14 is a diagram showing the configuration of a peripheral controller.

FIG. 14 is a diagram showing the configuration of the peripheral controller 360.

The peripheral controller 360 includes a transaction management circuit 362 and a packet handler circuit 364. The transaction management circuit 362 and the packet handler circuit 364 perform processing similar to the processing of the transaction management circuit 358 and the packet handler circuit 359 of the host controller 350.

4.2.3 Buffer Controller

Figure 15:
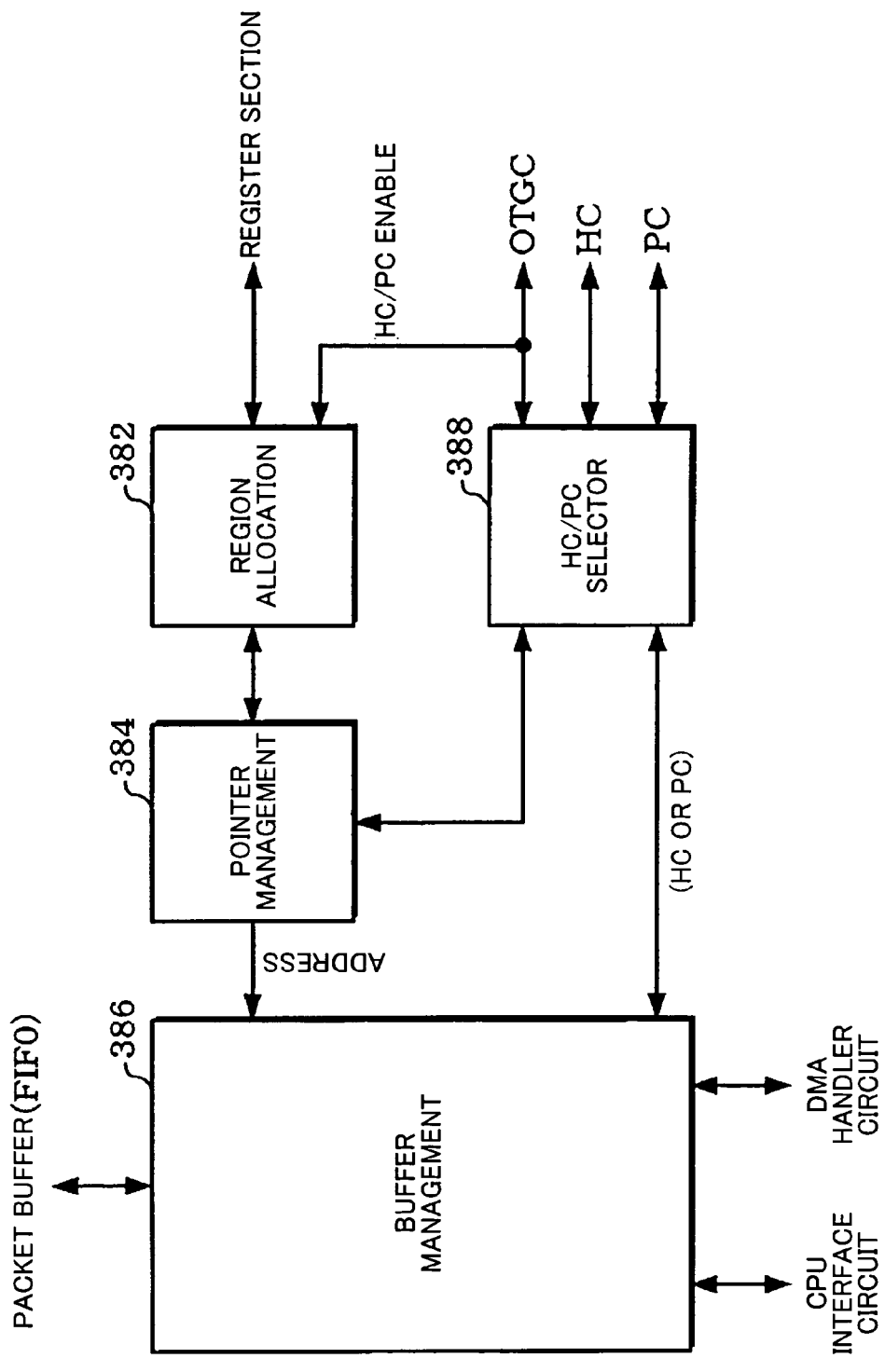
FIG. 15 is a diagram showing the configuration of a buffer controller.

FIG. 15 is a diagram showing the configuration of the buffer controller 380.

The buffer controller 380 includes a region allocation circuit 382. The region allocation circuit 382 is a circuit which allocates the buffer region (or a region which is assigned to the pipe region during the host operation and assigned to the endpoint region during the peripheral operation) in the packet buffer 390.

The region allocation circuit 382 calculates the region size, start address, and end address of the buffer region based on the maximum packet size (or a page size in a broad sense) and the page number. A write pointer and a read pointer of each buffer region are assigned to a DMA pointer, a CPU pointer, and a USB pointer corresponding to the data transfer direction.

Pointer information (or positional information) on the write pointer and the read pointer of each buffer region is retained by each transfer condition register (or PIPE/EP register) in the register section 370.

A pointer management circuit 384 is a circuit which generates an actual address for accessing the packet buffer 390 while updating the pointers. In more detail, the pointer management circuit 384 generates a CPU address, a DMA address, and a USB address based on various pointers assigned by the region allocation circuit 382. The pointer management circuit 384 updates the pointers each time an access from the CPU (or CPU interface circuit) or the DMA (or a DMA handler circuit) occurs, or each time transactions of the USB (or HC or PC) are completed (transmission or reception of handshake such as ACK or NAK). The updated pointer information is rewritten into each transfer condition register in the register section 370 through the region allocation circuit 382.

A buffer management circuit 386 is a circuit which manages access to the packet buffer 390. The buffer management circuit 386 receives an address from the pointer management circuit 384 and the like, and inputs or outputs data to or from the packet buffer 390 or outputs an address, output enable, write enable, read enable, or the like.

The buffer management circuit 386 arbitrates between accesses from the CPU (or CPU interface circuit), DMA (or DMA handler circuit), and USB (or a host controller or peripheral controller). One of the CPU address, DMA address, and USB address is output as the access address of the packet buffer 390 based on the arbitration result, whereby the data transfer path between the CPU, DMA or USB and the packet buffer 390 is established.

An HC/PC selector 388 switches connection between the buffer management circuit 386 (or a buffer controller 380) and the host controller 350 (HC) or the peripheral controller 360 (PC). For example, the HC/PC selector 388 connects the host controller 350 with the buffer management circuit 386 during the host operation, and connects the peripheral controller 360 with the buffer management circuit 386 during the peripheral operation. The HC/PC selector 388 switches the connection based on the HC/PC enable signal from the OTG controller 320 (OTGC).

5. Electronic Instrument

Examples of electronic instruments including the data transfer control device in the embodiments of the present invention are described below.

Figure 16A:
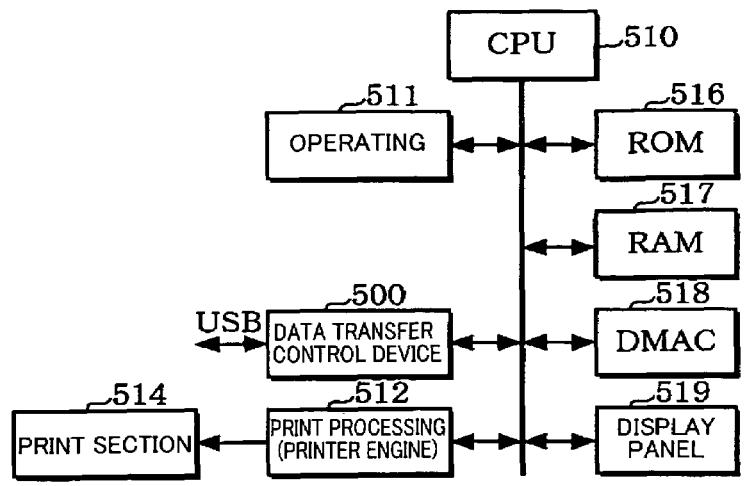
FIGS. 16A, 16B, and 16C are diagrams showing internal components of various electronic instruments.
Figure 17A:
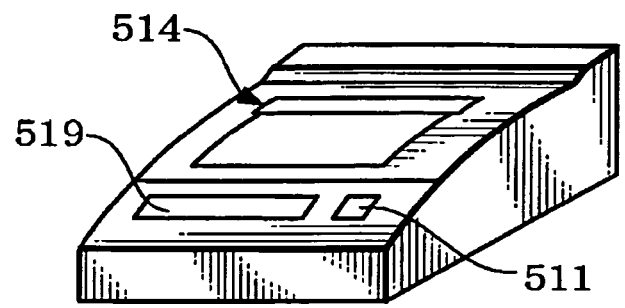
FIGS. 17A, 17B, and 17C show external views of various electronic instruments.

FIG. 16A shows internal components of a printer as an example of electronic instruments, and FIG. 17A shows an external view of the printer. A CPU (or a processing section) 510 controls the entire system and the like. An operating section 511 allows a user to operate the printer. A control program, fonts, and the like are stored in a ROM 516. A RAM 517 (or a system memory) functions as a work area for the CPU 510. A DMAC 518 is a DMA controller for transferring data without the CPU 510. A display panel 519 is used to notify the user of the operation state of the printer.

Serial print data (such as print data and image data) transmitted from another instrument such as a personal computer, a digital camera, or a digital video camera through the USB is converted into parallel print data by using a data transfer control device 500. The parallel print data after conversion is sent to a print processing section 512 (or a printer engine) by the CPU 510 or the DMAC 518. The parallel print data is subjected to given processing in the print processing section 512, and printed (or output) on paper by a print section 514 (or a device which performs data output processing) consisting of a print head and the like.

Figure 16B:
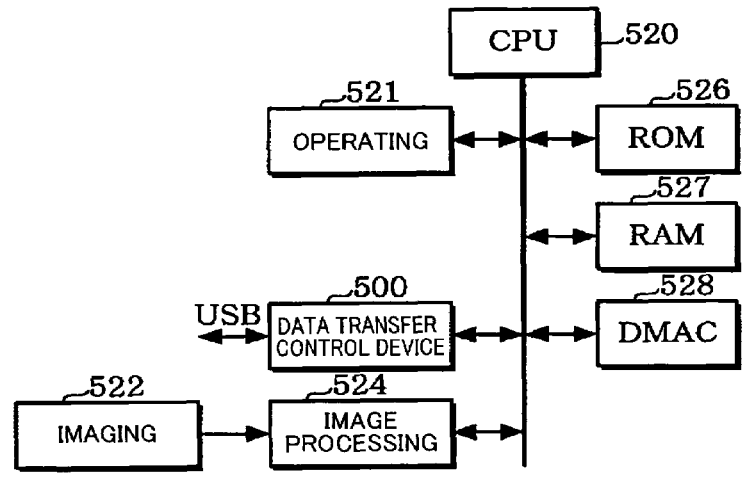
Figure 17B:
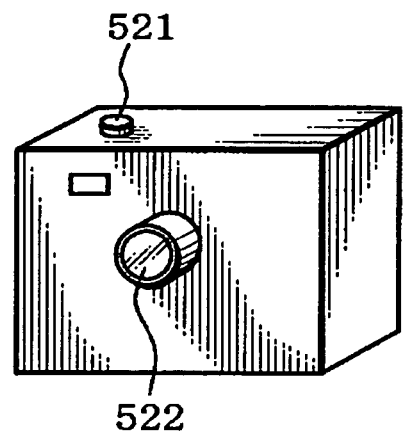

FIG. 16B shows internal components of a digital camera which is another example of electronic instruments, and FIG. 17B shows an external view of the digital camera. A CPU 520 controls the entire system and the like. An operating section 521 (such as a shutter button and an operating button) allows a user to operate the digital camera. A control program and the like are stored in a ROM 526. A RAM 527 functions as a work area for the CPU 520. A DMAC 528 is a DMA controller.

An image is taken by an imaging section 522 (or a device which performs data capture processing) consisting of a CCD, lens, and the like. The imaged data is processed by an image processing section 524. The processed image data is sent to the data transfer control device 500 by the CPU 520 or the DMAC 528. The data transfer control device 500 converts the parallel image data into serial data, and transmits the serial data to another instrument such as a printer, a storage device, or a personal computer through the USB.

Figure 16C:
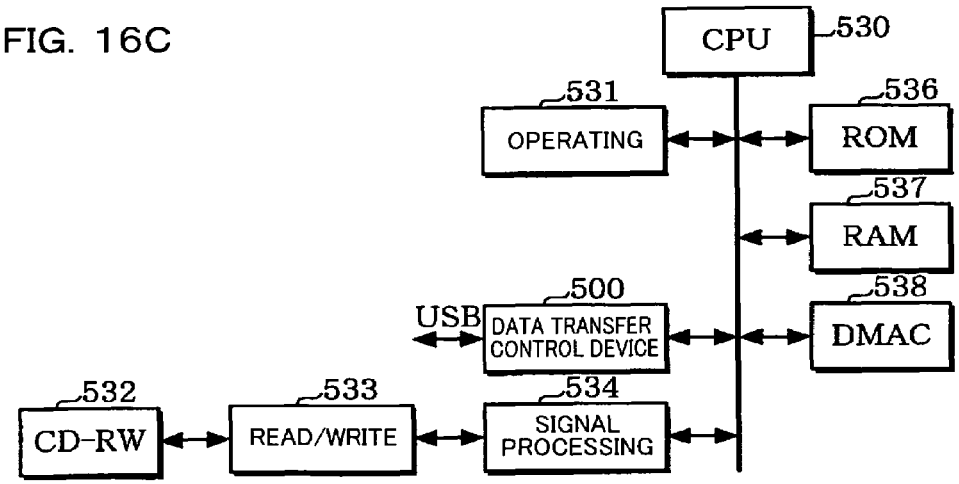
Figure 17C:
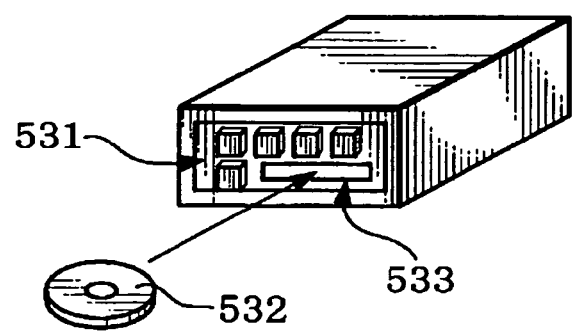

FIG. 16C shows internal components of a CD-RW drive (or a storage device) which is still another example of electronic instruments, and FIG. 17C shows an external view of the CD-RW drive. A CPU 530 controls the entire system and the like. An operating section 531 allows a user to operate a CD-RW. A control program and the like are stored in a ROM 536. A RAM 537 functions as a work area for the CPU 530. A DMAC 538 is a DMA controller.

Data read from a CD-RW 532 by a read/write section 533 (or a device which performs data capture processing or a data storage processing) consisting of a laser, motor, optical system, and the like is input to a signal processing section 534, and subjected to given signal processing such as error correction processing. The data subjected to the signal processing is sent to the data transfer control device 500 by the CPU 530 or the DMAC 538. The data transfer control device 500 converts the parallel data into serial data and sends the serial data to another instrument through the USB.

Serial data sent from another instrument through the USB is converted into parallel data by the data transfer control device 500. The parallel data is sent to the signal processing section 534 by the CPU 530 or the DMAC 538. The parallel data is subjected to given processing in the signal processing section 534, and stored on the CD-RW 532 by the read/write section 533.

In FIGS. 16A, 16B, and 16C, a CPU for controlling data transfer in the data transfer control device 500 may be provided separately from the CPU 510, 520 or 530.

An electronic instrument having the OTG functions can be implemented by applying the data transfer control device according to the embodiments of the present invention to an electronic instrument. Specifically, an electronic instrument can be allowed to have the role of the host or the role of the device, whereby applications which do not yet exist can be created.

The processing load of the CPU (or a processing section) incorporated in the electronic instrument is reduced by applying the data transfer control device in the embodiments of the present invention to an electronic instrument, whereby an inexpensive CPU can be used. Moreover, the CPU can afford to perform processing other than data transfer control processing, whereby an increase in performance of the electronic instrument and reduction of cost can be achieved. Furthermore, a program of firmware which operates on the CPU can be simplified, whereby the development period of the electronic instrument can be reduced.

As other examples of electronic instruments to which the data transfer control device according to the embodiments of the present invention can be applied, various optical disk (such as CD-ROM and DVD) drives, magneto-optical (MO) disk drives, hard disk drives, digital video cameras, portable telephones, scanners, TVs, VTRs, audio devices, telephones, projectors, personal computers, electronic notebooks, word processors, and the like can be given.

The present invention is not limited to the above embodiments. Various modifications and variations are possible within the spirit and scope of the present invention.

For example, the configuration of the data transfer control device in the present invention is not limited to the configuration described with reference to FIG. 4 and the like. Various modifications and variations are possible.

The hub dedicated data storage section is provided in the data transfer control device. However, the present invention is not limited thereto. A device dedicated data storage section may be provided in the data transfer control device.

The configuration of each block (such as HC, PC, or OTGC) of the data transfer control device is not limited to the configuration described in the embodiments. Various modifications and variations are possible.

The terms (such as OTG controller, CPU and firmware, host controller and peripheral controller, USB, pipe region and endpoint region) cited in the description in the specification as the terms in a broad sense (state controller, processing section, transfer controller, bus, buffer region, and the like) may be replaced by the terms in a broad sense in another description in the specification.

Part of requirements of any claim of the present invention could be omitted from a dependent claim which depends on that claim. Moreover, part of requirements of any independent claim of the present invention could be made to depend on any other independent claim.

In the embodiments of the present invention, the application examples of the USB OTG standard are described. However, the application of the present invention is not limited to the OTG standard. Specifically, the present invention may be applied to data transfer in the conventional USB 1.1 and USB 2.0 standards and a standard developed from these standards in addition to the USB OTG standard.

The following items are disclosed relating to the above-described embodiment.

According to one embodiment of the present invention, there is provided a data transfer control device for data transfer, the data transfer control device comprising:

a hub dedicated data storage section which stores a packet transferred between the data transfer control device and a hub;

a packet transmission section which cyclically issues a token packet to the hub for asking whether the state of the hub has changed or not;

a packet reception section which receives a response packet sent from the hub in response to the token packet; and a transfer controller which writes the response packet received by the packet reception section into the hub dedicated data storage section, and generates an interrupt which indicates that the state of the hub has changed.

In this data transfer control device, the transfer controller may write the response packet into the hub dedicated data storage section and generate the interrupt which indicates that the state of the hub has changed, on condition that the response packet is not a negative acknowledgement (NAK) packet which indicates that there is no data to send.

The hub includes a plurality of ports, and a device is connected to each port. Data can be transferred between the data transfer control device and a plurality of devices by connecting the devices through the hub.

In this embodiment, the hub dedicated data storage section which is used exclusively for transfer between the data transfer control device and the hub is provided when cyclically asking whether or not the state of the hub has changed by issuing a token packet. Upon receiving the response packet sent from the hub in response to the token packet, the data transfer control device determines whether or not the response packet is a NAK packet. If it is determined that the response packet is not a NAK packet, the data transfer control device writes the received response packet into the hub dedicated data storage section and generates an interrupt which indicates that the state of the hub has changed. Therefore, a processing section which is notified that the state of the hub has changed by the interrupt can recognize the change in the state of the hub by reading the data from the hub dedicated data storage section, and the data transfer control device can be set corresponding to the change.

When the response packet is a NAK packet, it is unnecessary to process the received response packet.

According to this embodiment, a dedicated data storage section is allocated to transfer for monitoring the change in the state of the hub and resources to be allocated to transfers between the data transfer control device and other devices are not used. If the frequency of the change of the state of the hub is low, resources which can be allocated to transfers between the data transfer control device and other devices are not wasted, whereby the degrees of freedom of transfer which can be set are not decreased.

Moreover, since the response packet is written into the hub dedicated data storage section only when it is determined that the state of the hub has changed, the storage region of the hub dedicated data storage section can be reduced as much as possible.

The data transfer control device according to this embodiment may further comprise a packet buffer in which a plurality of pipe regions are allocated, each of the pipe regions storing a packet transferred between one of the pipe regions and a corresponding endpoint, wherein a storage region of the hub dedicated data storage section may be provided in a region differing from a storage region of the packet buffer.

Since the hub dedicated data storage section physically differs from the packet buffer in which a plurality of pipe regions are allocated, a data transfer control device which monitors the state of the hub can be provided without reducing the storage region of the general-purpose packet buffer.

The data transfer control device may further comprise:

a packet buffer in which a plurality of pipe regions are allocated, each of the pipe regions storing a packet transferred between one of the pipe regions and a corresponding endpoint; and a transfer mode setting register in which is set data for setting a hub dedicated transfer mode or a normal transfer mode, wherein a storage region of the hub dedicated data storage section may be allocated for the transfer between the data transfer control device and the hub which is the endpoint when the hub dedicated transfer mode is set in the transfer mode setting register; and wherein a storage region of the packet buffer may be allocated for the transfer between the data transfer control device and the hub which is the endpoint when the normal transfer mode is set in the transfer mode setting register.

Since the hub dedicated transfer mode or the normal transfer mode can be set by providing the transfer mode setting register, and since the storage region of the hub dedicated data storage section is allocated to transfer between the data transfer control device and the hub or the endpoint only when the hub dedicated transfer mode is set, resources are not fixedly allocated for monitoring the hub and can be effectively utilized to increase the degrees of freedom of data transfer setting.

The data transfer control device may further comprise a transfer condition register having an instruction bit for instructing start of data transfer in which the hub dedicated data storage section is used, wherein the packet transmission section may issue the token packet when the instruction bit is active.

In the data transfer control device, the packet transmission section may cyclically issue the token packet from when the instruction bit becomes active until the instruction bit becomes inactive.

Since the instruction bit in the transfer condition register is used to cyclically issue the token packet, control of the processing section for an interrupt which occurs with low frequency can be simplified.

The data transfer control device may perform data transfer in conformity to the Universal Serial Bus (USB) standard.

The data transfer control device may further comprise:

a state controller which controls host operation performed by the data transfer control device when the data transfer control device is a host, or peripheral operation performed by the data transfer control device when the data transfer control device is a peripheral, by switching a plurality of states including a state for controlling the host operation and a state for controlling the peripheral operation, wherein the transfer controller includes a host controller which transfers data in the host operation, and a peripheral controller which transfers data in the peripheral operation;

wherein a plurality of pipe regions are allocated in a packet buffer in the host operation, and the host controller transfers a packet between one of the pipe regions and a corresponding endpoint;

wherein a plurality of endpoint regions are allocated in the packet buffer in the peripheral operation, and the peripheral controller transfers a packet between one of the endpoint regions and the host; and wherein in the host operation, the transfer controller writes the response packet into the hub dedicated data storage section and generates the interrupt which indicates that the state of the hub has changed, on condition that the response packet is not a negative acknowledgement (NAK) packet which indicates that there is no data to send.

The data transfer control device may perform data transfer in conformity to the Universal Serial Bus (USB) On-The-Go (OTG) standard.

According to this embodiment, the function of the dual-role device can be implemented. In addition to the implementation of such dual-role device, a data transfer control device which monitors the hub without wasting resources can be provided.

According to one embodiment of the present invention, there is provided an electronic instrument comprising the above data transfer control device, and a processor which controls the data transfer control device.

According to one embodiment of the present invention, there is provided a data transfer control method for data transfer, the method comprising:

cyclically issuing a token packet for asking whether the state of a hub has changed or not;

receiving a response packet from the hub in response to the token packet; and writing the response packet into a hub dedicated data storage section and generating an interrupt which indicates that the state of the hub has changed, on condition that the response packet is not a first packet which indicates that there is no data to send.

What is claimed is:

1. A data transfer control device for data transfer, the data transfer control device comprising:

a hub dedicated data storage section which stores a packet transferred between the data transfer control device and a hub;

a packet transmission section which cyclically issues a token packet to the hub for asking whether the state of the hub has changed or not;

a packet reception section which receives a response packet sent from the hub in response to the token packet;

a transfer controller which writes the response packet received by the packet reception section into the hub dedicated data storage section, and generates an interrupt which indicates that the state of the hub has changed;

a packet buffer in which a plurality of pipe regions are allocated, each of the plurality of pipe regions storing a packet transferred between one of the plurality of pipe regions and a corresponding endpoint; and a transfer mode setting register in which is set data for setting a hub dedicated transfer mode or a normal transfer mode, wherein a storage region of the hub dedicated data storage section is allocated for the transfer between the data transfer control device and the hub which is the endpoint when the hub dedicated transfer mode is set in the transfer mode setting register; and wherein a storage region of the packet buffer is allocated for the transfer between the data transfer control device and the hub which is the endpoint when the normal transfer mode is set in the transfer mode setting register.

2. The data transfer control device as defined in claim 1, wherein the transfer controller writes the response packet into the hub dedicated data storage section and generates the interrupt which indicates that the state of the hub has changed, on condition that the response packet is not a negative acknowledgement (NAK) packet which indicates that there is no data to send.

3. The data transfer control device as defined in claim 2, wherein the storage region of the hub dedicated data storage section is provided in a region differing from the storage region of the packet buffer.

4. The data transfer control device as defined in claim 3, further comprising:

a transfer condition register having an instruction bit for instructing start of data transfer in which the hub dedicated data storage section is used, wherein the packet transmission section issues the token packet when the instruction bit is active.

5. The data transfer control device as defined in claim 4, wherein the packet transmission section cyclically issues the token packet from when the instruction bit becomes active until the instruction bit becomes inactive.

6. The data transfer control device as defined in claim 2, further comprising:

a transfer condition register having an instruction bit for instructing start of data transfer in which the hub dedicated data storage section is used, wherein the packet transmission section issues the token packet when the instruction bit is active.

7. The data transfer control device as defined in claim 6, wherein the packet transmission section cyclically issues the token packet from when the instruction bit becomes active until the instruction bit becomes inactive.

8. The data transfer control device as defined in claim 2, further comprising:

a state controller which controls host operation performed by the data transfer control device when the data transfer control device is a host, or peripheral operation performed by the data transfer control device when the data transfer control device is a peripheral, by switching a plurality of states including a state for controlling the host operation and a state for controlling the peripheral operation;

the transfer controller including a host controller which transfers data in the host operation, and a peripheral controller which transfers data in the peripheral operation;

the plurality of pipe regions being allocated in the packet buffer in the host operation, and the host controller transferring a packet between one of the plurality of pipe regions and a corresponding endpoint; and a plurality of endpoint regions being allocated in the packet buffer in the peripheral operation, and the peripheral controller transferring a packet between one of the plurality of endpoint regions and the host;

wherein in the host operation, the transfer controller writes the response packet into the hub dedicated data storage section and generates the interrupt which indicates that the state of the hub has changed, on condition that the response packet is not a negative acknowledgement (NAK) packet which indicates that there is no data to send.

9. An electronic instrument comprising:

the data transfer control device as defined in claim 2; and a processor which controls the data transfer control device.

10. The data transfer control device as defined in claim 1, wherein the storage region of the hub dedicated data storage section is provided in a region differing from the storage region of the packet buffer.

11. The data transfer control device as defined in claim 10, further comprising:

a transfer condition register having an instruction bit for instructing start of data transfer in which the hub dedicated data storage section is used, wherein the packet transmission section issues the token packet when the instruction bit is active.

12. The data transfer control device as defined in claim 11, wherein the packet transmission section cyclically issues the token packet from when the instruction bit becomes active until the instruction bit becomes inactive.

13. The data transfer control device as defined in claim 10, further comprising:

a state controller which controls host operation performed by the data transfer control device when the data transfer control device is a host, or peripheral operation performed by the data transfer control device when the data transfer control device is a peripheral, by switching a plurality of states including a state for controlling the host operation and a state for controlling the peripheral operation;

the transfer controller including a host controller which transfers data in the host operation, and a peripheral controller which transfers data in the peripheral operation;

the plurality of pipe regions being allocated in the packet buffer in the host operation, and the host controller transferring a packet between one of the plurality of pipe regions and a corresponding endpoint; and a plurality of endpoint regions being allocated in the packet buffer in the peripheral operation, and the peripheral controller transferring a packet between one of the plurality of endpoint regions and the host;

wherein in the host operation, the transfer controller writes the response packet into the hub dedicated data storage section and generates the interrupt which indicates that the state of the hub has changed, on condition that the response packet is not a negative acknowledgement (NAK) packet which indicates that there is no data to send.

14. An electronic instrument comprising:
the data transfer control device as defined in claim 10; and
a processor which controls the data transfer control device.

15. The data transfer control device as defined in claim 1, further comprising:
a transfer condition register having an instruction bit for instructing start of data transfer in which the hub dedicated data storage section is used,
wherein the packet transmission section issues the token packet when the instruction bit is active.

16. The data transfer control device as defined in claim 15, wherein the packet transmission section cyclically issues the token packet from when the instruction bit becomes active until the instruction bit becomes inactive.

17. The data transfer control device as defined in claim 16, further comprising:
a state controller which controls host operation performed by the data transfer control device when the data transfer control device is a host, or peripheral operation performed by the data transfer control device when the data transfer control device is a peripheral, by switching a plurality of states including a state for controlling the host operation and a state for controlling the peripheral operation;

the transfer controller including a host controller which transfers data in the host operation, and a peripheral controller which transfers data in the peripheral operation;

the plurality of pipe regions being allocated in the packet buffer in the host operation, and the host controller transferring a packet between one of the plurality of pipe regions and a corresponding endpoint; and a plurality of endpoint regions being allocated in the packet buffet in the peripheral operation, and the peripheral controller transferring a packet between one of the plurality of endpoint regions and the host;

wherein in the host operation, the transfer controller writes the response packe into the hub dedicated data storage section and generates the interrupt which indicates that the state of the hub has changed, on condition that the response packet is not a negative acknowledgement (NAK) packet which indicates that there is no data to send.

18. An electronic instrument comprising:
the data transfer control device as defined in claim 16; and
a processor which controls the data transfer control device.

19. The data transfer control device as defined in claim 15, further comprising:
a state controller which controls host operation performed by the data transfer control device when the data transfer control device is a host, or peripheral operation performed by the data transfer control device when the data transfer control device is a peripheral, by switching a plurality of states including a state for controlling the host operation and a state for controlling the peripheral operation;

the transfer controller including a host controller which transfers data in the host operation, and a peripheral controller which transfers data in the peripheral operation;

the plurality of pipe regions being allocated in the packet buffer in the host operation, and the host controller transferring a packet between one of the plurality of pipe regions and a corresponding endpoint; and a plurality of endpoint regions being allocated in the packet buffer in the peripheral operation, and the peripheral controller transfers a packet between one of the plurality of endpoint regions and the host;

wherein in the host operation, the transfer controller writes the response packet into the hub dedicated data storage section and generates the interrupt which indicates that the state of the hub has changed, on condition that the response packet is not a negative acknowledgement (NAK) packet which indicates that there is no data to send.

20. An electronic instrument comprising:
the data transfer control device as defined in claim 15; and
a processor which controls the data transfer control device.

21. The data transfer control device as defined in claim 1, performing data transfer in conformity to the Universal Serial Bus (USB) standard.

22. The data transfer control device as defined in claim 1, further comprising:
a state controller which controls host operation performed by the data transfer control device when the data transfer control device is a host, or peripheral operation performed by the data transfer control device when the data transfer control device is a peripheral, by switching a plurality of states including a state for controlling the host operation and a state for controlling the peripheral operation;

the transfer controller including a host controller which transfers data in the host operation, and a peripheral controller which transfers data in the peripheral operation; and the plurality of pipe regions being allocated in the packet buffer in the host operation, and the host controller transferring a packet between one of the plurality of pipe regions and a corresponding endpoint; and a plurality of endpoint regions being allocated in the packet buffer in the peripheral operation, and the peripheral controller transferring a packet between one of the plurality of endpoint regions and the host;

wherein in the host operation, the transfer controller writes the response packet into the hub dedicated data storage section and generates the interrupt which indicates that the state of the hub has changed, on condition that the response packet is not a negative acknowledgement (NAK) packet which indicates that there is no data to send.

23. The data transfer control device as defined in claim 22, performing data transfer in conformity to the Universal Serial Bus (USB) On-The-Go (OTG) standard.

24. An electronic instrument comprising:
the data transfer control device as defined in claim 1; and
a processor which controls the data transfer control device.

25. A data transfer control method for data transfer, the method comprising:
storing a packet transferred between the data transfer control device and a hub;
cyclically issuing a token packet to the hub for asking whether the state of the hub has changed or not;
receiving a response packet from the hub in response to the token packet;
writing the response packet into a hub dedicated data storage section and generating an interrupt which indicates that the state of the hub has changed, on condition that the response packet is not a first packet which indicates that there is no data to send;
allocating a plurality of pipe regions in a packet buffer, each of the plurality of pipe regions storing a packet transferred between one of the plurality of pipe regions and a corresponding endpoint; and
setting data for setting a hub dedicated transfer mode or a normal transfer mode in a transfer mode setting register,
wherein a storage region of the hub dedicated data storage section is allocated for the transfer between the data transfer control device and the hub which is the endpoint when the hub dedicated transfer mode is set in the transfer mode setting register; and
wherein a storage region of the packet buffer is allocated for the transfer between the data transfer control device and the hub which is the endpoint when the normal transfer mode is set in the transfer mode setting register.

26. The data transfer control method as defined in claim 25, wherein the response packet is written into the hub dedicated data storage section and the interrupt which indicates that the state of the hub has changed is generated, on condition that the response packet is not the NAK packet which indicates that there is no data to send.

* * * * *